US012801637B2

(12) United States Patent
Haldar et al.

(10) Patent No.: US 12,801,637 B2
(45) Date of Patent: Nov. 17, 2026

(54) GENERATION OF DATA STORIES AND DATA SUMMARIES BASED ON USER QUERIES

(71) Applicant: Adobe Inc., San Jose, CA (US)

(72) Inventors: Promit Haldar, Berhampore (IN); Jasjot Singh, Faridabad (IN); G Rama Sai Priyanka, Hyderabad (IN); Vibhor Porwal, Bidhuna (IN); Iftikhar Ahamath Burhanuddin, Bangalore (IN)

(73) Assignee: Adobe Inc., San Jose, CA (US)

( * ) Notice: Subject to any disclaimer, the term of this patent is extended or adjusted under 35 U.S.C. 154(b) by 0 days.

(21) Appl. No.: 18/421,344

(22) Filed: Jan. 24, 2024

(65) Prior Publication Data

US 2025/0238442 A1 Jul. 24, 2025

(51) Int. Cl.

| | |
|---|---|
| ***G06F 16/28*** | (2019.01) |
| ***G06F 16/242*** | (2019.01) |
| ***G06F 40/289*** | (2020.01) |
| ***G06F 40/40*** | (2020.01) |

(52) U.S. Cl.

CPC ........ *G06F 16/287* (2019.01); *G06F 16/2425* (2019.01); *G06F 16/243* (2019.01); *G06F 40/289* (2020.01); *G06F 40/40* (2020.01)

(58) Field of Classification Search

CPC ................. G06F 16/287; G06F 16/243; G06F 16/2425

See application file for complete search history.

(56) References Cited

U.S. PATENT DOCUMENTS

| | | | | |
|---|---|---|---|---|
| 12,008,332 | B1 * | 6/2024 | Gardner | G06F 16/345 |
| 12,259,915 | B2 * | 3/2025 | Qadrud-Din | G06F 40/289 |
| 2012/0179449 | A1 * | 7/2012 | Raskino | G06F 16/345 709/206 |
| 2015/0339288 | A1 * | 11/2015 | Baker | G06F 40/166 704/9 |
| 2018/0285682 | A1 * | 10/2018 | Najibi | G06T 7/11 |

(Continued)

OTHER PUBLICATIONS

Carbonell et al., "The use of MMR, diversity-based reranking for reordering documents and producing summaries", In Proceedings of the 21st annual international ACM SIGIR conference on Research and development in information retrieval. Aug. 1998, pp. 335-336.

(Continued)

*Primary Examiner* — Mohammad S Rostami
(74) *Attorney, Agent, or Firm* — SHOOK, HARDY & BACON L.L.P.

(57) ABSTRACT

Methods, computer systems, computer storage media, and graphical user interfaces are provided for facilitating generation of data stories and data summaries in accordance with user queries. In one implementation, a user query is obtained in association with a dataset. Thereafter, a set of facts relevant to the user query are identified. A data story is generated using a portion of the set of facts relevant to the user query. The data story includes a set of visualizations corresponding with the portion of the set of facts relevant to the user query. The set of facts relevant to the user query is used to generate a data summary of the set of relevant facts. The data story and/or the data summary are provided for display.

17 Claims, 18 Drawing Sheets

(56) References Cited

U.S. PATENT DOCUMENTS

| | | | | |
|---|---|---|---|---|
| 2020/0110519 | A1* | 4/2020 | Vangala | G06F 3/0483 |
| 2020/0110623 | A1* | 4/2020 | Vangala | G06F 3/0483 |
| 2020/0210647 | A1* | 7/2020 | Panuganty | G06N 3/08 |
| 2021/0390127 | A1* | 12/2021 | Fox | G06F 16/35 |
| 2022/0058390 | A1* | 2/2022 | Tran | G06V 10/82 |
| 2022/0237228 | A1* | 7/2022 | Xu | G06F 16/2474 |
| 2023/0244690 | A1* | 8/2023 | Burhanuddin | G06F 16/2458 707/723 |
| 2024/0135095 | A1* | 4/2024 | Nichols | G06F 16/243 |
| 2024/0160651 | A1* | 5/2024 | Bhattacharjee | G06F 16/345 |
| 2024/0185039 | A1* | 6/2024 | Hughes | G06N 3/045 |
| 2024/0249081 | A1* | 7/2024 | UzZaman | G06F 40/40 |
| 2024/0256618 | A1* | 8/2024 | Adada | G06F 16/9536 |
| 2024/0273309 | A1* | 8/2024 | Heller | G06F 40/56 |
| 2024/0281487 | A1* | 8/2024 | Bathwal | G06F 16/9558 |
| 2024/0311559 | A1* | 9/2024 | Sengupta | G06Q 10/06393 |
| 2024/0419695 | A1* | 12/2024 | Matson | G06F 40/40 |
| 2024/0419710 | A1* | 12/2024 | Matson | G06F 16/3329 |
| 2025/0124066 | A1* | 4/2025 | McElvain | G06F 16/335 |
| 2025/0217427 | A1* | 7/2025 | Gelli | G06F 16/345 |

OTHER PUBLICATIONS

ChatGPT: "ChatGPT 3.5", Available online at : <https://chat.openai.com/>, 1 page.

Putra et al., "Evaluating text coherence based on semantic similarity graph", In Proceedings of TextGraphs-11: the Workshop on Graph-based Methods for Natural Language Processing. Aug. 3, 2017. pp. 76-85.

SBERT: "SentenceTransformers Documentation", Available online at : <https://www.sbert.net/>, 8 pages.

Shi et al., "Calliope: Automatic Visual Data Story Generation from a Spreadsheet", IEEE Transactions on Visualization and Computer Graphics, vol. 27, No. 2, 2020, pp. 453-463.

Vicuna. "Vicuna: An Open-Source Chatbot Impressing GPT-4 with 90%* ChatGPT Quality", Available online at : <https://lmsys.org/blog/2023-03-30-vicuna/>, Mar. 30, 2023. 10 pages.

Wang et al., "Datashot: Automatic generation of fact sheets from tabular data", IEEE Transactions on Visualization and Computer Graphics, vol. 26, No. 1, 2019, pp. 895-905.

Zhu et al., "Texygen: A benchmarking platform for text generation models", In The 41st international ACM SIGIR conference on research & development in information retrieval, Feb. 6, 2018. pp. 1097-1100.

* cited by examiner

| Fact Type ($t_i$) 304 | Subspace ($s_i$) 306 | Breakdown ($b_i$) 308 | Measure ($m_i$) 310 | Focus ($x_i$) 312 | Derived Value ($V_d$) 314 | Syntax 316 |
|---|---|---|---|---|---|---|
| Value | * | × | $N$ | × | derived value | The {{agg}} {{$m_i$}} is {{$V_d$}} when {{$s_i$}}. |
| Difference | * | C/T | $N$ | =2 | difference value | The difference between {{$x_i$[1]}} and {{$x_i$[2]}} regarding to their {{agg}} {{$m_i$}} is {{$V_d$}} when {{$s_i$}}. |
| Proportion | * | C/T | $N$ | =1 | percentage | The {{$x_i$}} accounts for {{$V_d$}} of the {{agg}} {{$m_i$}} when {{$s_i$}}. |
| Trend | * | T | $N$ | ≥ 0 | increasing/ decreasing | The {{$V_d$}} trend of {{agg}} {{$m_i$}} over {{$b_i$}}(s) when {{$s_i$}} and the values of {{$x_i$}} needs to pay attention. |
| Categorization | * | C | × | ≥ 0 | number of categories | There are {{$V_d$}} {{$b_i$}}(s) which are {{$C_1$}}, {{$C_2$}}, {{...}}, and {{$C_n$}} when {{$s_i$}}, among which {{$x_i$}} needs to pay attention. |
| Distribution | * | C | $N$ | ≥ 0 | × | The distribution of the {{agg}} {{$m_i$}} over {{$b_i$}}(s) when {{$s_i$}} and {{$x_i$}} needs to pay attention. |
| Rank | * | C/T | $N$ | =3 (top 3) | × | In the {{agg}} {{$m_i$}} ranking of different {{$b_i$}}(s), the top three {{$b_i$}}(s) are {{$x_i$[0]}}, {{$x_i$[1]}}, {{$x_i$[2]}}, when {{$s_i$}}. |
| Association | * | C/T | $N \times N$ | × | correlation coefficient | The Pearson correlation between the {{$m_i$[1]}} and the {{$m_i$[2]}} is {{$v_d$}} when {{$s_i$}}. |
| Extreme | * | C/T | $N$ | =1 (max/min) | maximum/minimum | The {{$v_d$}} value of the {{agg}} {{$m_i$}} is {{$x_i$}} when {{$s_i$}}. |
| Outlier | * | C/T | $N$ | =1 (outlier) | outlier score | The {{*agg*}} {{$m_i$}} of {{$x_i$}} is an outlier when compared with that of other {{$b_i$}}(s) when {{$s_i$}}. |

*FIG. 3*

302

400 Algorithm 1: Relevant Fact Extraction

402 Input:

1. Encoded Fact Corpus, $F$
2. User query, q= [$q_1$, $q_2$ ... $q_W$] // W is the total number of words in query.
3. Encoding model, M
4. Number of facts to retrieve, N (typically 150)

Steps:

404 1. $q_e$ = *M.encode*(q)

406 2. *key phrases* = *M.encode*(*keyphrase_extract*(*q*))
// keyphrase_extract(q) is a function for extracting key phrases from q 408 3. *query_sim* = *cosine_sim*($q_e$,*F*)[: N]
// this step is to retrieve top N similar facts to the encoded query, $q_e$ 410 4. *key_sim* = *cosine_sim*(*keyphrases, F*)[: 5]
// some additional facts retrieved via key phrase-based similarity search (5 facts per key phrase)

412 5. *all_sim* = *filter_unique*(*query_sim, key_sim*)
//discarding common facts in query_sim and key_sim 414 6. *return sorted*(*all_sim*) // sorted on the decreasing order of similarity to user query 416 Output:

A list of top N plus some facts (derived via key phrase-based and entire query-based similarity search). This list is the relevant fact set of $F_R$.

*FIG. 4*

500 Algorithm 2: Generating Data Story

502 Input:

1. Relevant Fact set, $F_R$.
2. Number of facts to be presented in data story, D.
3. Relevance parameter, λ.
4. Query string, q.

504 Steps:

1. Using MMR algorithm, select D facts from $F_R$ conditioned on user query q and relevance parameter, λ.

506 Output:

A list of D facts derived from $F_R$, based on MMR scores.

FIG. 5

Algorithm 3: Refining Data Story

602 Input:

1. Data story and initial user query, *q*.
2. Relevance binary feedback, f = [0,1,1,0 ... ,1]

604 Steps:

1. Use Rocchio's Algorithm to update the user query vector.
2. Go back to Step 2.
3. Present the new data story.

606 Output:

Refined data story with facts much more relevant to user query.

FIG. 6

Before feedback: ~702

The decreasing trend of total Small Bags across Date (YEAR)(s) when region is Orlando.
The region, Total US, accounts for 37.722253021259% of the total Total Bags when type is organic.
The decreasing trend of total Average Price across Date (YEAR)(s) when type is organic.
The total Large Bags of 2016 is an outlier compared with that of the other Date (YEAR)(s) when region is Los Angeles.
The distribution of the total Small Bags across region when type is organic, Date is 2016.
The total Average Price of 2018 is an outlier compared with that of the other Date (YEAR)(s) when region is Orlando.
The increasing trend of total Extra-Large Bags across Date (YEAR)(s) when type is conventional.
The increasing trend of total Large Bags across Date (YEAR)(s) when region is RichmondNorfolk.
The decreasing trend of total Average Price across Date (YEAR)(s) when region is Los Angeles.
The decreasing trend of total Volume across Date (YEAR)(s).
The increasing trend of total Total Bags across Date (YEAR)(s) when region is Las Vegas.
The decreasing trend of total Total Bags across Date (YEAR)(s) when region is Hartford Springfield.
The decreasing trend of total Large Bags across Date (YEAR)(s) when type is organic.
The minimum value of total Total Bags across region(s) is for Sacramento when type is organic.
The decreasing trend of total Total Bags across Date (YEAR)(s) when region is Sacramento.

Note: Only 8 facts provide information about trends of Avocado bag sales.

After feedback: ~704

The decreasing trend of total Large Bags across Date (YEAR)(s) when region is Orlando.
The increasing trend of total Small Bags across Date (YEAR)(s) when type is organic.
The decreasing trend of total Small Bags across Date (YEAR)(s) when region is RichmondNorfolk.
The decreasing trend of total Small Bags across Date (YEAR)(s) when region is Hartford Springfield.
The increasing trend of total Total Bags across Date (YEAR)(s) when region is Las Vegas.
The decreasing trend of total Total Bags across Date (YEAR)(s) when type is conventional.
The decreasing trend of total Total Bags across Date (YEAR)(s) when region is Sacramento.
The decreasing trend of total Small Bags across Date (YEAR)(s) when region is Los Angeles.
The decreasing trend of total Small Bags across Date (YEAR)(s).
The decreasing trend of total Large Bags across Date (YEAR)(s) when region is New York.
The decreasing trend of total Total Bags across Date (YEAR)(s) when region is Syracuse.
The decreasing trend of total Total Bags across Date (YEAR)(s) when region is Denver.
The increasing trend of total Extra-Large Bags across Date (YEAR)(s) when region is Total US.
The increasing trend of total Small Bags across Date (YEAR)(s) when region is Atlanta.
The decreasing trend of total Extra-Large Bags across Date (YEAR)(s) when region is Pittsburgh.

Note: All 15 facts provide information about trends of bag sales.

*FIG. 7*

802 Fact tuple (e.g.): ((RANK, {'Event': 'Men +80kg'}, Country, SUM - ['Prize Money (USD)'], 0.989644980058074, None, ['Russia', 'North Macedonia', 'South Korea']), {'categorical_subspace': {'Event': 'Men +80kg'}, 'temporal_subspace': {}, 'categorical_breakdown': 'Country', 'temporal_breakdown': None, 'fact_type': <FactTypes.RANK: 7>, 'measure': ['Prize Money (USD)'], 'agg': <AggTypes.SUM: 1>}, 20.668008942090587)

804 Fact Caption: In the total Prize Money (USD) ranking of Country(s), the top 3 Country(s) are Russia, North Macedonia, South Korea when Event is Men +80kg.

806 Fact Contextual Data: {"Russia": "75000", "North Macedonia": "50000", "South Korea": "25000"}

808 Contextual fact: In the total Prize Money (USD) ranking of Country(s), the top 3 Country(s) are Russia, North Macedonia, South Korea when Event is Men +80kg. {"Russia": "75000", "North Macedonia": "50000", "South Korea": "25000"}.

*FIG. 8*

Sentence 1: In the total Rank ranking of Country(s), the top 3 Country(s) are Australia, Egypt, Spain when Sport is Artistic Swimming
Sentence 2: The minimum value of total Age across Medal(s) is for Silver when Sport is Swimming
Sentence 3: The Country, United States, accounts for 25.0% of the total Rank when Event is Women's 400m Freestyle
Sentence 4: The distribution of the total Rank across Medal when Sport is Swimming
902 Sentence 5: There are 4 Medal(s) which are No Medal, Bronze, Gold, Silver
Sentence 6: The maximum value of total Age across Country(s) is for United States when Sport is Swimming
904 Sentence 7: The total Rank of Swimming is an outlier compared with that of the other Sport(s) when Event is Men's 4 x 200m Freestyle Relay Team
Sentence 8: In the total Age ranking of Country(s), the top 3 Country(s) are Russia, Netherlands, Sweden when Event is Women's 100m Back stroke
Sentence 9: The Discipline, SWM, accounts for 100.0% of the total Rank when Sport is Swimming
Sentence 10: In the total Rank ranking of Country(s), the top 3 Country(s) are Lithuania, South Korea, United States when Event is Men's 200m Freestyle
Sentence 11: The Country, Russia, accounts for 25.0% of the total Rank when Event is Women's 100m Breaststroke
Sentence 12: In the total Rank ranking of Country(s), the top 3 Country(s) are Papua New Guinea, Egypt, Seychelles when Event is Men's One Person Dinghy – Laser
Sentence 13: The minimum value of total Rank across Medal(s) is for Gold when Sport is Artistic Swimming
Sentence 14: In the total Age ranking of Country(s) , the top 3 Country(s) are United States, Russia, China when Medal is Silver
Sentence 15: In the total Rank ranking of Country(s), the top 3 Country(s) are Sweden, Greece, Cuba when Event is Women's Pole Vault Self-BLEU scores:
Sentence 1: Self-BLEU score = 0.9230023234382333
Sentence 2: Self-BLEU score = 0.9877985852388396
Sentence 3: Self-BLEU score = 0.9799178235201347
Sentence 4: Self-BLEU score = 0.8732544513760695
Sentence 5: Self-BLEU score = 0.5108982468400775
Sentence 6: Self-BLEU score = 0.9475399627526682
Sentence 7: Self-BLEU score = 0.7068920719858334
Sentence 8: Self-BLEU score = 0.895205164986091
Sentence 9: Self-BLEU score = 0.8248534233539271
Sentence 10: Self-BLEU score = 0.8989901213534633
Sentence 11: Self-BLEU score = 0.9197080561110867
Sentence 12: Self-BLEU score = 0.768800210029302
Sentence 13: Self-BLEU score = 0.9644905617979569
Sentence 14: Self-BLEU score = 0.9044950457898068
Sentence 15: Self-BLEU score = 0.8504200570214269

FIG. 9

Algorithm 4: Selecting facts for Data Summary

1002 Input:

1. Set of all relevant facts $F_R$ extracted via similarity search.
2. Token limit of LLM, $T$.

1004 Steps:

1. For each fact $f_i$ in $F_R$, calculate $s_i = -\log(self\_bleu(f_i)) + I_N(f_i)$.
2. For each fact $f_i$ in $F_R$, calculate $l(f_i)$ as length of tokens in fi and its tokens in its corresponding contextual information, $l(f_{ci})$.
3. Determine total length of each fact as: $l(f_i) + l(f_{ci})$.
4. $[f_1, f_2, \ldots f_N]$ are binary decision variables, N is number of facts in $F_R$.
5. Solve ILP to determine optimal fact set F0 containing K facts such that:
   (i) $\sum_{i=1}^{K} s_i$ *is maximum.*
   (ii) $\sum_{i=1}^{K} l(f_i) + l(f_{ci}) \leq T$.

1006 Output:

Optimal fact set $F_0$ containing K facts and their corresponding contextual information.

FIG. 10

1100 Example Prompt:

1102 The following facts are derived based on a single year of Olympic games. The user is interested in "How was the performance of Women in various sports?"

1104 You must act as an ANALYST to write a data story summarizing the facts given. In each fact I have appended numerical values related to it. Include the numerical values in the story.

1106 Also, in each fact, I have given a citation in the form @x#. Whenever you write the story, include the corresponding fact or facts (you can use multiple citations) by citing it in the form of [x] (single citation) or [x1, x2, ..] (In case of multiple citations), only using third brackets.

1108 The facts are:

1110 The distribution of the total Prize Money (USD) 1112 across Age when Event is Women Team{"22-32": "12600000.0" 1114, "32-42": "2150000.0", "62-72": "0.0", "12-22": "1975000.0", "52-62": "0.0", "42-52": "0.0"}@ 496 #. 1116

The distribution of the total Prize Money (USD) across Medal when Event is Women\'s Long Jump{"Gold": "75000.0", "Silver": "50000.0", "Bronze": "25000.0", "No Medal": "0.0"}@ 31 #.

The distribution of the total Prize Money (USD) across Medal when Event is Women\'s Four Team{"Silver": "200000.0", "Bronze": "100000.0", "Gold": "300000.0", "No Medal": "0.0"}@ 491 #.

The distribution of the total Prize Money (USD) across Medal when Event is Women\'s Marathon{"Silver": "50000.0", "Bronze": "25000.0", "Gold": "75000.0", "No Medal": "0.0"}@ 492 #.

*FIG. 11*

Algorithm 5: Obtaining summary and post-processing.

1202 Input:

1. Optimal Fact Set, $F_0$.
2. Instructions and dataset context.

1204 Steps:

1. Add citation to each contextual fact in $F_0$.
2. Form the prompt by concatenating dataset context, instructions, and contextual facts.
3. Obtain summary from LLM.
4. Post-process to obtain citations for referring to corresponding fact in $F_0$.
5. Calculate scores for data summary as described earlier.

1206 Output:

Data summary with visualizations and text.

*FIG. 12*

GENERATION OF DATA STORIES AND DATA SUMMARIES BASED ON USER QUERIES

BACKGROUND

Data visualizations can provide a powerful way to convey information. In particular, visualizing data in a meaningful or compelling way can be influential and facilitate decision making. Many existing data analytics and visualization tools are sophisticated. Creating a meaningful, or compelling, data visualization using such visualization tools, however, can be difficult and tedious. For example, many data consumers have limited experience with data science and/or graphical designs, making generation of data visualizations difficult. An extensive amount of data and data visualizations can make it even more time-consuming to identify specific data and an appropriate manner in which to present the data. Accordingly, although such existing data analytics and visualization tools are powerful, they may be difficult and inefficient for many data consumers to use.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Various aspects of the technology described herein are generally directed to systems, methods, and computer storage media for, among other things, facilitating automated generation of visual designs and insights via natural language processing. In this regard, embodiments described herein facilitate automated generation of data stories and data summaries via user queries. In this regard, a user may provide or input a query (e.g., a natural language query) and, based on the input, obtain an automatically generated data story and/or data summary. As such, a user only needs a high-level idea or understanding about the data, design, and/or insights desired. Accordingly, the user need not have a strong understanding of the data or the visualization technologies in order to generate a meaningful visual design and a summary thereof. Further, user feedback can be obtained and used to refine the data story and/or data summary in an efficient and effective manner.

In operation, at a high level, to generate a data story, a set of relevant facts are identified based on the user query. A particular set of the relevant facts can be selected (e.g., using a maximum margin relevance algorithm) to generate a data story to present to the user in response to the user query. In some cases, a user may provide feedback indicating preferences associated with the data story. For instance, the user may indicate a particular desired or undesired attribute associated with a fact included in the data story. Based on the user feedback, the query may be refined, and the refined query can be used to identify a new set of relevant facts, which can then be used to select facts for a data story. Such an iterative process may continue until a desired data story is attained. Further, the set of relevant facts, as identified based on the user query (or refined user query), can be used to provide as input (via a prompt) to a machine learning model, such as a large language model. The machine learning model generates a data summary that summarizes the dataset from which the data story was generated. In some cases, contextual facts are used as input, via a prompt, to a machine learning model to generate a data summary. In this way, a more meaningful summary of the dataset can be generated. In some embodiments, to limit the contextual facts included in the prompt, the particular contextual facts may be selected based on a fact score (e.g., based on diversity and importance).

BRIEF DESCRIPTION OF THE DRAWINGS

The technology described herein is described in detail below with reference to the attached drawing figures, wherein:

FIG. 3 provides an example table with possible values for fact tuples for various fact types, in accordance with aspects of the technology described herein;

FIG. 4 provides an example algorithm for relevant fact extraction, in accordance with aspects of the technology described herein;

FIG. 5 provides an example algorithm for selecting facts for a data story, in accordance with aspects described herein;

FIG. 6 provides an example algorithm for refining a data story, in accordance with aspects of the technology described herein;

FIG. 7 provides an example of using user relevance feedback to refine a data story, in accordance with aspects of the technology described herein;

FIG. 8 provides an example contextual fact that may be included in a prompt, in accordance with aspects of the technology described herein;

FIG. 9 provides an example of fact diversity, in accordance with embodiments described herein;

FIG. 10 provides one example of an algorithm that may be implemented to select contextual facts for a prompt to generate a data summary, in accordance with embodiments described herein;

FIG. 11 provides an example prompt used to generate a data summary, in accordance with embodiments described herein;

FIG. 12 provides an example algorithm for generating a data summary and analyzing the generated data summary, in accordance with embodiments described herein;

DETAILED DESCRIPTION

Figure 1:
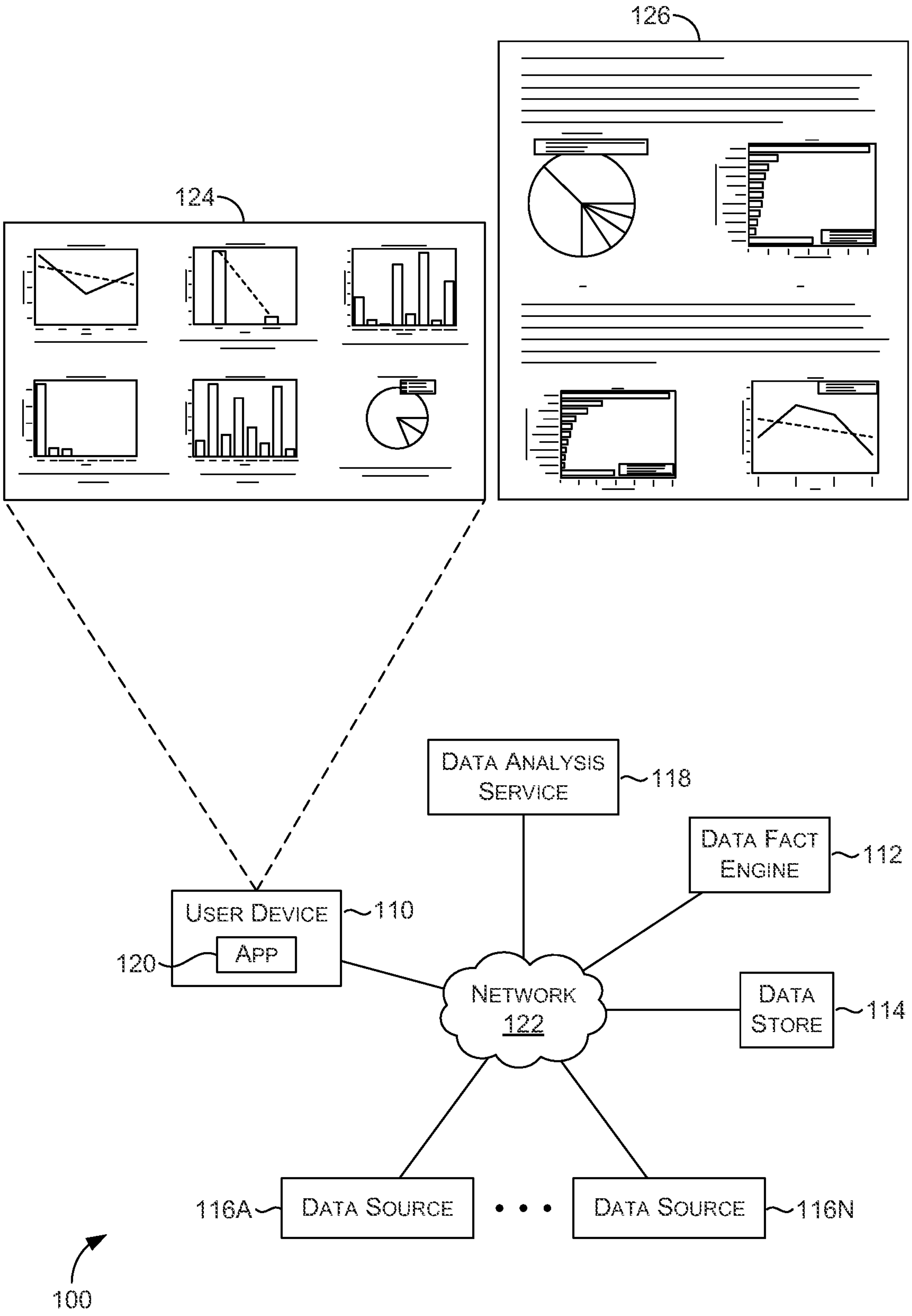
FIG. 1 is a block diagram of an exemplary system for facilitating generation of data stories and data summaries, suitable for use in implementing aspects of the technology described herein.

The technology described herein is described with specificity to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms “step” and “block” may be used herein to connote different elements of methods employed, the terms should not be interpreted as implying any particular order among or between various steps herein disclosed unless and except when the order of individual steps is explicitly described.

Overview

As data is becoming increasingly pervasive and plentiful, many individuals seek to use such data to provide meaningful data visualizations to others. Individuals oftentimes have unique perspectives and ideas on how to generate a meaningful visualization, or otherwise provide a story from data. Visualizing data in a meaningful or compelling way can be influential and facilitate decision making.

Many existing data analytics and visualization tools are sophisticated. Creating a meaningful, or compelling, data visualization using such visualization tools, however, can be difficult. For example, many data consumers have limited experience with data science and/or graphical designs. Accordingly, although such existing data analytics and visualization tools are powerful, they may be difficult and inefficient for many data consumers to use.

Such difficulties and inefficiencies may transpire at many steps in the data visualization workflow, including exploring data, identifying insights, and generating and customizing designs. By way of example, with regard to exploring data, users often have only high-level ideas of the desired information. However, conventional data visualization authoring tools require users to specify data fields for use in generating charts. It may be difficult for many users to map their high-level ideas to specific data fields. With regard to finding insights, statistical insights such as distributions, outliers, and correlations are one approach that users may use to drive data exploration and tell compelling stores. However, without data science knowledge and programming skills, it may be difficult for users to discover data insights. With regard to customizing charts, users often have evolving design needs. Initially, a user may desire to view a line chart. Subsequently, the user may desire to add filters and change colors. Existing tools require users to translate their high-level design concepts like “line chart” or “add a filter” to manual user interface actions, such as selecting a button, selecting from a menu, etc. As another example, a strong chart title, highlighting, and annotations facilitate understanding a visualization. Adding highlighting and annotations is a tedious task, particularly when there are a lot of marks. For instance, using a mouse to select a particular line to highlight among numerous lines (e.g., 50+) may be difficult. Users, however, often do not have the expertise or time to learn sophisticated user interface tools.

Accordingly, manual visualization authoring tools that utilize a manual workflow for data exploration and visualization can be difficult and time-consuming. As described, an analyst may need to select which variables to explore, decide what kind of visualization charts to use, inspect if useful insights exist, and repeat. Such tools may be too tedious for non-experts who have limited data science knowledge or graphic design skills.

Further, conventional automated analytics tools can also be tedious and difficult for non-experts. Conventional automated analytics tools may select interesting data variables or generate appropriate visual representations. For example, one such tool can automatically recommend chart types based on users' variable selections. Although such automated analytics tools can provide helpful guidance, they lack an input channel for users to communicate their intents so as to get desired results quickly. Further, any inputs require the users to be familiar with the data and specify concrete data queries. However, non-expert users often only have vague ideas or questions. It may be difficult for non-expert users to map their ideas to the concrete queries. In this way, upon reviewing visualizations in a data story, the user can interact with the user interface to make simple refinements to the data story. Such a trial-and-error approach, however, generally results in iterative modifications to attain the user's goals, thereby resulting in unnecessary utilization of computing device resources.

Moreover, even when a desired visualization, such as a chart, is generated (e.g., manually or in an automated manner) based on a dataset, there is a lack of communication between the dataset and the analyst, as visualizations often do not provide a lot of information. Accordingly, analysts may need to review the charts and derive information and insights therefrom. For example, to present such visualizations to a particular audience, an analyst may need to review each of the visualizations and generate a natural language summary that can be presented or distributed to provide a more holistic and contextual description of the visualizations. In addition to a contextually inadequate description that might be manually generated, it consumes computing resources to locate desired visualizations, review the dataset, and generate various summaries and insights to provide a summary of the data, including relevant visualizations. For example, navigation to various visuals, the dataset, and analytic tools may be needed to generate a summary of data that includes various visualizations. Further, the user may need to interact with the summary to make refinements thereto. Such a trial-and-error approach, however, generally results in iterative modifications to attain the user's goals, thereby resulting in unnecessary utilization of computing device resources.

As such, embodiments described herein facilitate automated generation of data stories and data summaries via user queries. In this regard, a user may provide or input a query (e.g., a natural language query) and, based on the input, obtain an automatically generated data story and data summary. As such, a user only needs a high-level idea or understanding about the data, design, and/or insights desired. Accordingly, the user need not have a strong understanding of the data or the visualization technologies in order to generate a meaningful visual design and a summary thereof. Further, user feedback can be obtained and used to refine the data story and/or data summary in an efficient and effective manner.

At a high level, implementations described herein employ queries, such as natural language queries, to facilitate creation of data stories and data summaries. In particular, a user may simply input ideas or thoughts (e.g., via a verbal or written input). Based on the input, a data story and data summary can be automatically generated. To generate a data story, a set of relevant facts are identified based on the user query. A particular set of the relevant facts can be selected (e.g., using a maximum margin relevance algorithm) to generate a data story to present to the user in response to the user query. In some cases, a user may provide feedback indicating preferences associated with the data story. For instance, the user may indicate a particular desired or undesired attribute associated with a fact included in the data story. Based on the user feedback, the query may be refined and the refined query can be used to identify a new set of relevant facts, which can then be used to select facts for a data story. Such an iterative process may continue until a desired data story is attained.

Further, the set of relevant facts, as identified based on the user query (or refined user query), can be used to provide as input (via a prompt) to a machine learning model, such as a large language model. The machine learning model can be used to generate a data summary that summarizes the dataset from which the data story was generated. In some cases, contextual facts can be used as input, via a prompt, to a machine learning model to generate a data summary. A contextual fact generally includes context to represent a fact. In embodiments, a contextual fact can include a fact caption and contextual data associated with the corresponding fact. In this way, a more meaningful summary of the dataset can be generated. As described herein, in some cases, the machine learning model, such as an Large Language Model (LLM), includes a limit to the size of input (e.g., via a token limit). Accordingly, in some embodiments, to limit the contextual facts included in the prompt, the particular contextual facts may be selected based on a fact score. In some examples, a fact score is generated for a fact in accordance with diversity of the fact in a set of relevant facts, as well as importance of the fact. In this way, the facts or contextual facts included in the prompt include diverse and important facts.

Advantageously, embodiments described herein facilitate efficient and effective generation of data stories and data summaries. In particular, the technology described herein enables usage of a reduced amount of computer resources as it more specifically analyzes aspects of interest to a user (e.g., input via a query and user feedback). For example, as described herein, a data story generated for a user is based on the user query and refined in accordance with user feedback associated with the data story, or aspects associated therewith. Further, in addition to generating a desired data story, aspects of the technology automatically generate a data summary that summarizes the data story and/or the dataset from which the data story was generated. The automated data summary also corresponds to a user's interest, as the data included in the prompt to generate the data summary is based on facts identified as relevant to the user query, or a refined user query (e.g., based on user feedback in association with the data story). Generating a data summary in accordance with a user's preferences and interests enables usage of a reduced amount of computer resources, for instance, as an iterative manual implementation is not unnecessarily using computing resources.

Various terms are used throughout the description of embodiments provided herein. A brief overview of such terms and phrases is provided here for ease of understanding, but more details of these terms and phrases are provided throughout.

A data story generally refers to a manner in which to present data in a visually appealing and easy-to-understand manner related to a topic or to provide a visual story of data. A data story may include any number of fact visualizations to convey information. A fact visualization generally refers to any visualization of data that can illustrate data and, in some cases, provide captions or insights associated therewith. For example, fact visualizations may include charts, graphs, captions, and/or insights corresponding therewith. In this regard, a set or collection of fact visualizations may be used to present a story regarding a topic.

A fact or a data fact represents a piece of information extracted from a dataset. In some cases, a data fact measures a collection of data items in a subspace of an input dataset based on a measurable data field. Facts can be extracted from a dataset, such as a tabular dataset. The fact can be represented in a data story using a fact visualization (e.g., including a graphical design and a caption). A fact can also be represented using a fact tuple.

A fact tuple refers to a representation of a fact using an ordered sequence of values. In this regard, a fact $f_i \in F$ is defined by a fact tuple using various attributes, such as type, subspace, measure, breakdown, focus, and/or aggregate.

A fact caption refers to natural language text representing or describing a fact. In embodiments, a fact caption is generated using a template to provide a natural language text (e.g., phrase, sentence, or set of sentences) to describe a fact.

A contextual fact generally refers to a fact that includes context associated with the fact. In this regard, additional contextual data for each fact $f_i$ in the set of relevant facts, $F_R$, is identified and appended, supplemented, or aggregated with the corresponding fact. The fact may be represented via a fact caption. In this regard, a contextual fact includes a fact caption and contextual data associated therewith. Contextual data may be in various formats. As one example, contextual data may be in the form of numerical or categorical values related to various attributes associated with the fact tuple, such as, for example, subspaces, measures, breakdowns, aggregates, focus, etc.

A relevant fact refers to a fact that corresponds or matches with a user query (or a refined user query). In some cases, to identify relevant facts, a key phrase search can be performed. In this regard, key phrases can be extracted from the query for use in performing the search. In other cases, the entire user query is used to perform the similarity search to identify relevant facts. In yet other cases, a similarity search can be performed using both key phrases and the entire user query to identify relevant facts.

A data summary refers to a natural language summary of a dataset, for example, that was used to generate a data story. A data summary is generally provided in a natural language form along with visualizations (e.g., fact visualizations that may include a graphical design and caption). A data summary provides a more comprehensive experience than a data story (which generally includes a sequence of visualizations and corresponding captions). For example, coverage in a data story can be limited, and templatized captions may be less engaging. On the other hand, a data summary provides information and insights regarding the dataset along with the visualizations. Such a summary is easy to follow and interpret, as it presents information succinctly with context and provides a condensed and efficient presentation of key findings and trends, enabling the audience to grasp main insights and conclusions.

Overview of Exemplary Environments for Facilitating Generation of Data Stories and Data Summaries via User Queries Referring initially to FIG. 1, a block diagram of an exemplary network environment 100 suitable for use in implementing embodiments described herein is shown. Generally, the system 100 illustrates an environment suitable for facilitating data stories and data summaries via user queries (e.g., natural language queries). Among other things, embodiments described herein effectively and efficiently generate data stories and data summaries in accordance with queries provided by a user. In this regard, a user can input or provide a high-level idea and, based on the input, be automatically provided with a corresponding data story and data summary. A data story generally refers to a set of visualizations of data that can illustrate data and insights associated therewith. A data story conveys a story associated with a topic using visualizations. In this regard, a data story is a representation of a sequence of story pieces, known as facts, in the form of compelling narrative visualizations and captions. For example, a data story may include charts, graphs, and insights corresponding therewith. Such a set of visualizations may be used to present a story or visual regarding a topic. By way of example only, an example data story 124 is provided in FIG. 1.

A data summary refers to a natural language summary of the data along with visualizations. A data summary provides a more comprehensive experience than a data story. For example, a data summary provides a natural language description of the dataset from which the data story is generated. In this regard, the data summary provides more context, key findings, and trends, in addition to being described in a manner that is easy to understand and interpret. By way of example only, an example data summary 126 is provided in FIG. 1.

The network environment 100 includes a user device 110, a data fact engine 112, a data store 114, data sources 116*a*-116*n* (referred to generally as data source [s] 116), and a data analysis service 118. The user device 110, the data fact engine 112, the data store 114, the data sources 116*a*-116*n*, and the data analysis service 118 can communicate through a network 122, which may include any number of networks such as, for example, a local area network (LAN), a wide area network (WAN), the Internet, a cellular network, a peer-to-peer (P2P) network, a mobile network, or a combination of networks.

The network environment 100 shown in FIG. 1 is an example of one suitable network environment and is not intended to suggest any limitation as to the scope of use or functionality of embodiments disclosed throughout this document, and nor should the exemplary network environment 100 be interpreted as having any dependency or requirement related to any single component or combination of components illustrated therein. For example, the user device 110 and data sources 116*a*-116*n* may be in communication with the data fact engine 112 via a mobile network or the Internet, and the data fact engine 112 may be in communication with data store 114 via a local area network. Further, although the environment 100 is illustrated with a network, one or more of the components may directly communicate with one another, for example, via HDMI (high-definition multimedia interface) and DVI (digital visual interface). Alternatively, one or more components may be integrated with one another, for example, at least a portion of the data fact engine 112 and/or data store 114 may be integrated with the user device 110 and/or data analysis service 118. For instance, a portion of the data fact engine 112 may be integrated with a server (e.g., data analysis service) in communication with a user device, while another portion of the data fact engine 112 may be integrated with the user device (e.g., via application 120).

The user device 110 can be any kind of computing device capable of facilitating generation of data stories and data summaries via user queries. For example, in an embodiment, the user device 110 can be a computing device such as computing device 1700, as described above with reference to FIG. 17. In embodiments, the user device 110 can be a personal computer (PC), a laptop computer, a workstation, a mobile computing device, a PDA, a cell phone, or the like.

The user device can include one or more processors and one or more computer-readable media. The computer-readable media may include computer-readable instructions executable by the one or more processors. The instructions may be embodied by one or more applications, such as application 120 shown in FIG. 1. The application(s) may generally be any application capable of facilitating generation of data stories and data summaries via user queries. In some implementations, the application(s) comprises a web application, which can run in a web browser, and could be hosted at least partially server-side (e.g., via data fact engine 112 or data analysis service 118). In addition, or instead, the application(s) can comprise a dedicated application. In some cases, the application is integrated into the operating system (e.g., as a service). As one specific example application, application 120 may be a visual design tool or other data analysis tool that provides various data and data visualizations. Such an application may be accessed via a mobile application, a web application, or the like.

User device 110 can be a client device on a client-side of operating environment 100, while data fact engine 112 and/or data analysis service 118 can be on a server-side of operating environment 100. Data fact engine 112 and/or data analysis service 118 may comprise server-side software designed to work in conjunction with client-side software on user device 110 so as to implement any combination of the features and functionalities discussed in the present disclosure. An example of such client-side software is application 120 on user device 110. This division of operating environment 100 is provided to illustrate one example of a suitable environment, and it is noted there is no requirement for each implementation that any combination of user device 110, data fact engine 112, and/or data analysis service 118 remain as separate entities.

In an embodiment, the user device 110 is separate and distinct from the data fact engine 112, the data store 114, the data sources 116, and the data analysis service 118 illustrated in FIG. 1. In another embodiment, the user device 110 is integrated with one or more illustrated components. For instance, the user device 110 may incorporate functionality described in relation to the data fact engine 112. For clarity of explanation, embodiments are described herein in which the user device 110, the data fact engine 112, the data store 114, the data sources 116, and the data analysis service 118 are separate, while understanding that this may not be the case in various configurations contemplated.

As described, a user device, such as user device 110, can facilitate generation and/or presentation of data stories and data summaries via user queries. A user device 110, as described herein, is generally operated by an individual or entity interested in viewing visualizations of data (e.g., in the form of graphs, charts, insights, etc.). As can be appreciated, a user interested in viewing data visualizations need not be an individual or entity associated with capturing or providing a dataset from which the data visualizations are generated. For example, in some cases, a user desiring to view data stories and/or data summaries may be an individual gathering insights of trends of data provided by another entity (e.g., in a collaborative environment or obtained via the Internet).

In some cases, automated data story and/or data summary generation may be initiated at the user device 110. For example, a user may input or provide a user query, such as a natural language query. A natural language query generally refers to any query having natural language. In this regard, a user can speak or type at will to provide aspects of a desired data visualization. Various aspects a user may indicate as desired may include dataset attributes, design attributes, and insight attributes. Dataset attributes refer to attributes related to the data. For example, a user may specify particular fields, variables, or dimensions of interest. Design attributes refer to attributes related to a visualization design. For example, a user may specify a particular type of desired chart. Insight attributes refer to attributes related to insights. For example, a user may specify a type of information desired to be interpreted from the data.

As can be appreciated, in some cases, a user of the user device 110 that may initiate a data story and/or data summary is a user that can view the data. In additional or alternative cases, an administrator, programmer, or other individual associated with an organization may initiate generation of a data story and/or data summary, but not necessarily be a consumer or viewer of such information.

A user query or input (e.g., a natural language query) may be provided via an application 120 operating on the user device 110. In this regard, the user device 110, via an application 120, might allow a user to input, select, or otherwise provide a query. The application 120 may facilitate the inputting of a query in a verbal form of communication or a textual form of communication. The user device 110 can include any type of application and may be a stand-alone application, a mobile application, a web application, or the like. In some cases, the functionality described herein may be integrated directly with an application or may be an add-on, or plug-in, to an application.

Such a query may be input at the user device 110 in any manner. For instance, upon accessing a particular application (e.g., a data analytics application), a user may be presented with, or navigate to, a text input tool to input a query. As another example, a user may select an icon to initiate input via a voice query. Irrespective of a type of input, a user may provide various aspects including dataset attributes, design attributes, and/or insight attributes.

The user device 110 can communicate with the data fact engine 112 to provide queries, initiate generation of data stories and data summaries, and/or obtain data stories and data summaries. In embodiments, for example, a user may utilize the user device 110 to initiate a generation of a data story and/or data summary via the network 122. For instance, in some embodiments, the network 122 might be the Internet, and the user device 110 interacts with the data fact engine 112 (e.g., directly or via data analysis service 118) to initiate generation of a data story and/or data summary. In other embodiments, for example, the network 122 might be an enterprise network associated with an organization. It should be apparent to those having skill in the relevant arts that any number of other implementation scenarios may be possible as well.

With continued reference to FIG. 1, the data fact engine 112 can be implemented as server systems, program modules, virtual machines, components of a server or servers, networks, and the like. At a high level, the data fact engine 112 manages data story and data summary generation. In particular, the data fact engine 112 can obtain a query, or portion thereof, such as a natural language query from user device 110, and a dataset, such as data from data sources 116. Data sources 116*a*-116*n* may be any type of source providing data (e.g., a dataset for generating a data story and/or data summary). Generally, the data fact engine 112 can receive queries and/or datasets from any number of devices. As such, the data fact engine 112 can identify and/or collect data from various user devices, such as user device 110, and sources, such as data sources 116*a*-116*n*. In this regard, the data fact engine 112 can retrieve or receive data collected or identified at various components, or sensors associated therewith.

As described, in some cases, the data fact engine 112 can receive queries for generating data stories and/or data summaries via the user device 110 (or other device). User queries, such as natural language queries, received from a device, such as user device 110, can include various attributes (e.g., data attributes, design attributes, and/or insight attributes) manually or explicitly input by the user (input queries or selections). Generally, the data fact engine 112 can receive queries from any number of devices. In accordance with receiving a query (e.g., via the user device 110), the data fact engine 112 can access and utilize data to generate a data story(s) and/or data summary(s). As described, in various embodiments, a user-provided attribute(s) is not required. For example, default attributes (e.g., a default or identified dataset attribute, design attribute, and/or insight attribute) can be used to generate a data story(s) and/or data summary(s).

In accordance with a user query, the data fact engine 112 can use data from a dataset to generate a data story and/or data summary. Such data may be any data that can be used to generate a data story and/or data summary. A dataset used for forming a data story and/or data summary can be any type of data that may be analyzed. By way of example and not limitation, data within a dataset may include data that is sensed or determined from one or more sensors, such as location information of mobile device(s), smartphone data, activity information (for example: app usage; online activity; searches; browsing certain types of webpages; listening to music; taking pictures; voice data such as automatic speech recognition; activity logs; communications data including calls, texts, instant messages, and emails; website posts; or other user data associated with communication events) including user activity that occurs over more than one device, user history, session logs, application data, contacts data, calendar and schedule data, notification data, social network data, news, online gaming data, e-commerce activity, sports data, research data, health data, and nearly any other source of data that may be used to generate data stories and/or data summaries, as described herein.

A dataset to use may be a default dataset or a specified dataset. For example, as a user navigates to a particular dataset, the dataset may be used to generate a data story and/or data summary. As another example, a user may specify or select a particular dataset for generating or viewing a data story and/or data summary.

Such data can be initially collected at remote locations or systems and transmitted to data store 114 for access by data fact engine 112. In accordance with embodiments described herein, data collection may occur at data sources 116. In some cases, data sources 116, or a portion thereof, may be user devices, that is, computing devices, operated by a user. As such, user devices, or components associated therewith, can be used to collect various types of data. For example, in some embodiments, data may be obtained and collected at a user device via one or more sensors, which may be on or associated with one or more user devices and/or other computing devices. As used herein, a sensor may include a function, routine, component, or combination thereof for sensing, detecting, or otherwise obtaining information, such as visualization data, and may be embodied as hardware, software, or both.

In addition or in the alternative to data sources 116 including user devices, data sources 116 may include servers, data stores, or other components that collect data, for example, from user devices. For example, in interacting with a user device, datasets may be captured at data sources 116 and, thereafter, such data can be provided to the data store

114 and/or data fact engine 112. In this regard, dataset contributors may operate a client device and provide a dataset to the data source 116. Although generally discussed as data provided to the data store 114 and/or data fact engine 112 via data sources 116 (e.g., a user device or server, data store, or other component in communication with user device), data may additionally or alternatively be obtained at and provided from the data analysis service 118, or other external server, for example, that collects data. Datasets, or data associated therewith, can be obtained at a data source periodically or in an ongoing manner (or at any time) and provided to the data store 114 and/or data fact engine 112 to facilitate generation of data stories and/or data summaries.

In accordance with embodiments described herein, and as more fully described below with reference to FIG. 2, the data fact engine 112 facilitates automated generation of data stories and data summaries via user queries. In this regard, the data fact engine 112 can obtain a user query, and, based on the user query, obtain an automatically generated data story and data summary. Further, user feedback can be obtained and used to refine the data story and/or data summary in an efficient and effective manner.

In operation, to generate a data story, a set of relevant facts are identified based on the user query. A particular set of the relevant facts can be selected (e.g., using a maximum margin relevance algorithm) to generate a data story to present to the user in response to the user query. In some cases, a user may provide feedback indicating preferences associated with the data story. For instance, the user may indicate a particular desired or undesired attribute associated with a fact included in the data story. Based on the user feedback, the query may be refined, and the refined query can be used to identify a new set of relevant facts, which can then be used to select facts for a data story. Such an iterative process may continue until a desired data story is attained.

Further, the set of relevant facts, as identified based on the user query (or refined user query), can be used to provide as input (via a prompt) to a machine learning model, such as a large language model. The machine learning model can be used to generate a data summary that summarizes the dataset from which the data story was generated. In some cases, contextual facts can be used as input, via a prompt, to a machine learning model to generate a data summary. A contextual fact generally includes context to represent a fact. In embodiments, a contextual fact can include a fact caption and contextual data associated with the corresponding fact. In this way, a more meaningful summary of the dataset can be generated. As described herein, in some cases, the machine learning model, such as an LLM, includes a limit to the size of input (e.g., via a token limit). Accordingly, in some embodiments, to limit the contextual facts included in the prompt, the particular contextual facts may be selected based on a fact score. In some examples, a fact score is generated for a fact in accordance with diversity of the fact in a set of relevant facts as well as importance of the fact. In this way, the facts or contextual facts included in the prompt include diverse and important facts.

In some cases, the data story and/or data summary can be provided to the user device 110 for display to the user. In other cases, the data analysis service 118 may use such data to perform further analysis and/or render or provide such data to the user device 110. The data analysis service 118 may be any type of server or service that can analyze data, render data, and/or provide information to user devices. Although data analysis service 118 is shown separate from the data fact engine 112, as can be appreciated, the data fact engine can be integrated with the data analysis service 118 or other service. The user device 110 can present received data or information in any number of ways, and is not intended to be limited herein. As an example, a data story 124 and/or data summary 126 can be presented via application 120 of the user device. The data story 124 and/or data summary 126 may be presented concurrently, sequentially, etc. In some cases, the data story 124 and/or data summary 126 are presented automatically. In other cases, the data story 124 and/or data summary 126 are presented in response to a user selection to view such data.

Advantageously, utilizing implementations described herein enables generation of data stories and/or data summaries to be performed in an efficient and more accurate manner (e.g., in accordance with user desires). Further, the data stories and/or data summaries can dynamically adapt to align with information desired by the user (e.g., based on user queries and refinements thereof). As such, a user can view desired information and can assess the information accordingly.

Figure 2:
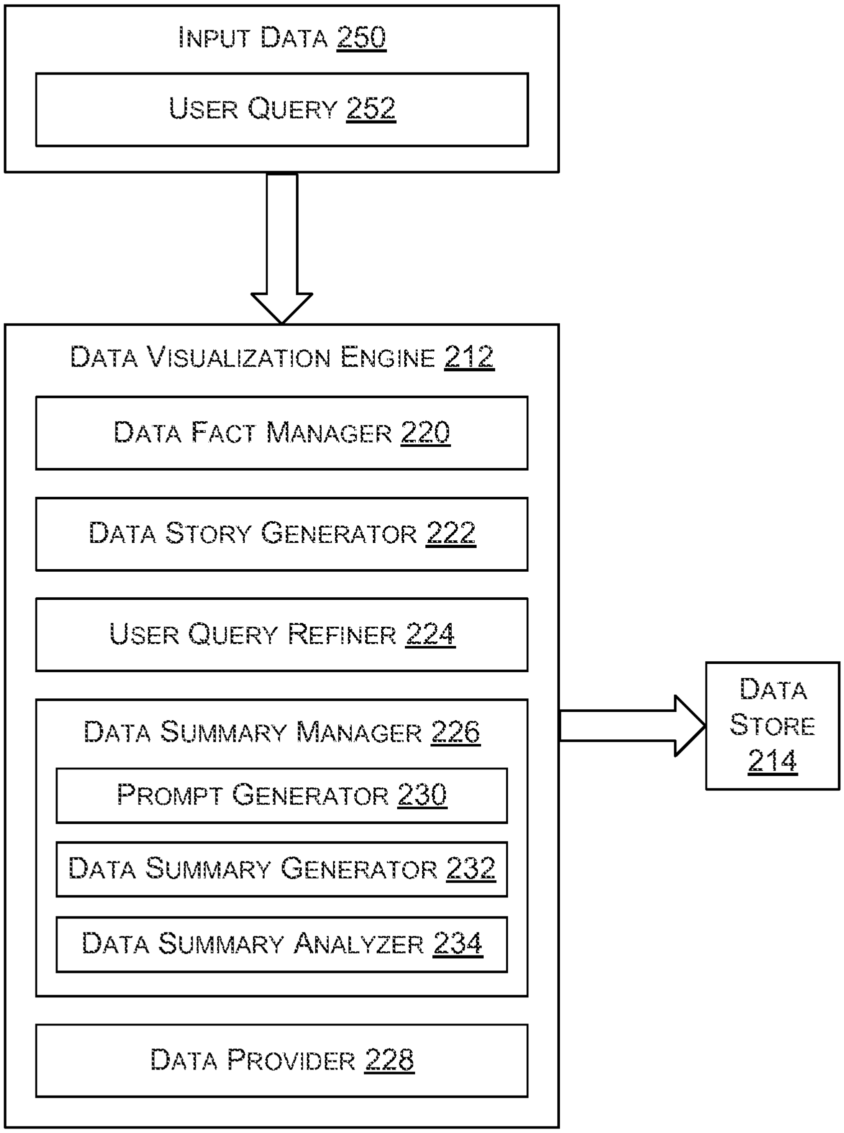
FIG. 2 is an example implementation for facilitating generation of data stories and data summaries, via a data fact engine, in accordance with aspects of the technology described herein.

Turning now to FIG. 2, FIG. 2 illustrates an example implementation for facilitating generation of data stories and/or data summaries via data fact engine 212. The data fact engine 212 can communicate with the data store 214. The data store 214 is configured to store various types of information accessible by the data fact engine 212, or other server or component. In embodiments, data sources (such as data sources 116 of FIG. 1), user devices (such as user device 110 of FIG. 1), and data fact engine 212 can provide data to the data store 214 for storage, which may be retrieved or referenced by any such component. As such, the data store 214 may store queries, datasets, fact tuples, fact visualizations, fact captions, contextual facts, relevant facts, fact scores, data summaries, data stories, and/or the like.

In operation, the data fact engine 212 is generally configured to manage generation of data stories and data summaries. In embodiments, the data fact engine 212 includes a data fact manager 220, a data story generator 222, a data story refiner 224, a data summary manager 226, and a data provider 228. According to embodiments described herein, the data fact engine 212 can include any number of other components not illustrated. In some embodiments, one or more of the illustrated components 220, 222, 224, 226, and 228 can be integrated into a single component or can be divided into a number of different components. Components 220, 222, 224, 226, and 228 can be implemented on any number of machines and can be integrated, as desired, with any number of other functionalities or services.

The data fact manager 220 is generally configured to manage data facts associated with a dataset. In particular, data facts can be identified in association with a dataset from which a data story or set of data stories are generated. In this regard, the data fact manager 220 can extract facts from a dataset, such as a tabular dataset. As described, a data fact or fact represents a piece of information extracted from a dataset. In embodiments, a data fact is designed to measure a collection of data items in a subspace of an input dataset based on a measurable data field. In some cases, a fact $f_i \in F$ is defined or represented by a fact tuple, such as:

$f_i$={type ($t_i$), subspace ($s_i$), measure ($m_i$), breakdown ($b_i$), focus ($x_i$)}.

In this fact tuple, type (denoted as $t_i$) indicates the type of information described by the fact. Various fact types may include, for example, difference, proportion, trend, categorization, distribution, rank, association, extreme, and outlier. Subspace (denoted as $s_i$) describes the data scope of the fact, which is defined by a set of data filters in the form: $\{\{F_1=V_1\}, \ldots, \{F_k=V_k\}\}$, where $F_i$ indicates a data field and $V_i$ indicates a corresponding value selected to filter the data. In some cases, a subspace is the entire dataset. Measure (denoted as $m_i$) may include a numerical data field based on which a data value can be retrieved, or a derived value (e.g., count, sum, average, minimum, or maximum) can be calculated by aggregating the subspace of each data group. Breakdown (denoted as $b_i$) is a set of temporal or categorical data fields based on which the data items in the subspace are further divided into groups. Focus (denoted as $x_i$) indicates a set of specific data items in the subspace that require attention. A fact tuple may include alternative or additional fields. For example, a fact tuple may include an aggregate, which indicates a manner in which to calculate a measure (e.g., total, average, minimum, maximum, etc.). For example, in some cases, fact tuples may include a derived value (denoted as $V_d$), such as a textual summary of the trend (e.g., "increasing" or "decreasing"), the specific difference value between two cases described by a difference fact, or the correlation coefficient computed for an association fact.

By way of example only, assume a fact corresponds to "Total profit on Ford cars is increasing over years." Such a fact can be represented as a fact tuple as <TREND, Company=Ford, Profit, Year, Total>. Other examples of fact tuples (including only subspace, measure, and breakdown) include:

| |
|---|
| {Y = 2020, M = Jan}, measure = sales, breakdown = Paid_user. |
| {Y = 2020}, measure = sales, breakdown = months. |
| {City = New York, Paid_user = True}, measure = sales, breakdown = Adobe domain names. |

FIG. 3 provides a table 302 with possible values for fact tuples for various fact types. The various types of information that may be represented by a fact tuple are shown. For example, fact type 304 may include different types of facts (e.g., value, difference, proportion, trend, categorization, etc.). The subspace 306, breakdown 308, measure 310, and focus 312 are also included as different types of information for a fact tuple. Table 302 also includes a syntax or template 314 that can be used to generate a fact caption for a particular fact type. In the table, C denotes the number of categorical columns, T denotes the number of temporal columns, and N denotes the number of numerical columns.

In some embodiments, a brute force search may be employed to extract facts, or fact tuples, from a dataset. For example, a brute force search may be executed to identify fact tuple possibilities (e.g., based on different filters for subspaces and/or measures). In some cases, the fact tuples may be identified in association with satisfying certain conditions. For example, one condition may be that there are at most two categorical filters and at most two temporal filters for the subspace. By way of example only, January 2020 is considered to include two filters-one filter for year and one filter for month.

In some cases, the data fact manager 220 generates importance scores for fact tuples. An important score generally represents an extent of importance of a corresponding fact tuple. Such importance scores may be used to rank the fact tuples. Importance scores may be generated in any of a number of ways. As one example, an importance of a fact is defined as the product of a significance score of a fact and a self-information score of the fact, as follows:

$$I_s(f_i) = S(f_i) \cdot I(f_i).$$

For this importance score, $I_s(f_i)$, $S(f_i)$ is the significance score of a fact, $f_i$, and $I(f_i)$ is the self-information score of the fact $f_i$. In embodiments, a normalization (e.g., min max normalization) is applied to normalize the importance score of each fact type. In this regard, normalization is performed subject to the fact type. For example, importance scores associated with distribution facts are normalized with minimum and maximum values being equal to that amongst the distribution facts. Normalized importance scores can ensure preventing bias during optimization. A normalized important score for a fact can be represented as follows:

$$I_N(f_i) = \frac{I_s(f_i) - \min(I_s(f_T))}{\max(I_s(f_T)) - \min(I_s(f_T))}.$$

In this approach, $I_N(f_i)$ is the normalized importance score of fact $f_i$. Max $(I_s(f_T))$ represents the maximum importance score of all facts of a fact type that is the same as that of $f_i$, Min $(I_s(f_T))$ represents the minimum importance score of all facts with a fact type that is the same as that of $f_i$.

As described, a self-information score is used to generate an importance score for a fact tuple. The self-information score, $I(f_i)$, can be defined as the negative logarithm of the probability of occurrence of the fact, as follows:

$$I(f_i) = -\log_2(P(f_i)).$$

$P(f_i)$ indicates an occurrence probability of the fact given the input data. A fact with a lower occurrence probability in the data space has a higher self-information value as it reveals uncommon patterns, which are usually more meaningful and interesting. In some embodiments, the occurrence probability of the fact is determined by taking the product of occurrence probability of subspace, occurrence probability of breakdown for the given fact type, occurrence probability of measure for the given fact type, and occurrence probability of focus for the given subspace, as follows:

$$P(f_i) = P(s_i).P(b_i \mid t_i).P(m_i \mid t_i).P(x_i \mid s_i).$$

In this occurrence probability of a fact, the probability of subspace $$P(s_i) = \frac{1}{2^m} \cdot \prod_{j=1}^{k} P(F_j = V_j),$$

where k is the number of filters in the subspace and m is the total number of columns that can be used for subspace filters. $P(F_j=V_j)$ is the probability that the filter $F_j$ takes the value $V_j$. A filter can represent a particular value of a subspace.

The occurrence probability of breakdown corresponds with a given fact type. In this regard, for a trend fact type, $P(b_i|t_i)=1/T$. For a categorization and distribution fact type, $P(b_i|t_i)=1/C$. For other fact types, $P(b_i|t_i)=1/(C+T)$. C represents the number of categorical columns, and T represents the number of temporal columns. T may represent any time period, such as months, years, etc.

The occurrence probability of measure for the given fact type can be represented as $P(m_i|t_i)=1/N$ for all fact types. In this occurrence probability, N represents the number of numerical columns.

The occurrence probability of focus for a given subspace may be represented as $P(x_i|s_i)=\text{count}(x_i)/\text{count}(s_i)$, wherein count denotes the cardinality of the set. As can be appreciated, occurrence probabilities for facts can be represented using alternative or additional probabilities.

As described, a significance score is also used to generate an importance score for a fact tuple. The significance score $S(f_i)\in[0,1]$ generally estimates the significance of the data patterns described by a fact. A significance score can be generated in any number of ways. In some embodiments, a significance score is defined separately for each fact type based on hypothesis tests. For example, a significance score can estimate the significance of data patterns described by a fact based on auto-insight techniques.

In some embodiments, the data fact manager 220 converts fact tuples to captions, such as natural language captions. A caption generally refers to a textual explanation of a visual design (e.g., chart or graph). Generally, a caption is a brief text portion. In some cases, the captions are generated using templates. For instance, template-based methods can be employed to generate captions for charts. To ensure readability and avoid ambiguity, a syntax may be defined for each fact type that regulates the generation results. By way of example, and with reference to FIG. 3, FIG. 3 provides various syntaxes 316 for various fact types, which can be used to generate a caption. Any number of captions, templates, or syntaxes may correspond with a fact type or fact.

Returning to FIG. 2, in accordance with creating captions, such as templatized captions, the data fact manager 220 can convert the captions to vector embeddings. Templatized captions may be converted to vector embeddings using a pre-trained encoding model, such as sentence bidirectional encoder representations from transformers (SBERT). In embodiments, the vector embeddings representing the captions may form the fact corpus. In this regard, a fact corpus that includes fact captions can be generated, which can include vector embeddings representing captions associated with fact tuples. In some cases, an index mapping is generated that maps captions (e.g., templatized natural language captions of fact tuples), and their corresponding indices in the fact corpus are maintained using a hash map. A hash map may be used to maintain a mapping from the index of fact (in the fact corpus) to the corresponding caption of the fact.

Generating a fact corpus, or updating a fact corpus, can be performed at various times. In some cases, generating or updating a fact corpus is performed periodically, for example, on a weekly basis. In other cases, a fact corpus may be generated or updated upon an occurrence of an event (e.g., a user selection to view a data story and/or data summary).

The data story generator 222 is generally configured to generate data stories. Data stories can be generated in any of a number of ways. As one example, a data story is generated in accordance with a user query. In this regard, the data story generator 222 can obtain input data 250, which can include a user query 252, such as a natural language query. The user query, or portion thereof, may be input, selected, or otherwise provided in a textual form or a verbal form via a user interface. Such a user query(s) may indicate a manner in which to tailor or customize data visualizations. For example, as previously described, a user may indicate information related to desired data, visual design, and/or insight for a data visualization or data story via a natural language query in unstructured form.

The user query 252 may be or include a command, a question, a list of words and phrases, or the like. As can be appreciated, the user query may include any number of details related to various visualization aspects, such as data, visual design, and/or insight. As one example, a natural language query may be more general or vague. As another example, a natural language query may be more specific. User queries, or portions thereof, may be stored, for instance, at data store 214.

To generate a data story based on a user query, a searching or matching process may be employed using a fact corpus. As described, the fact corpus may include various facts, for example, in the form of fact captions, or representations thereof (e.g., vector embeddings). To perform the search, a contextual similarity search (e.g., a cosine similarity search) may be used to search fact captions (e.g., natural language templatized fact captions) or representations thereof (e.g., vector embeddings) in the fact corpus based on the user query. As such, in some cases, to perform the contextual similarity search, the user query may be converted to a vector embedding. In embodiments, the technology used to convert the user query to the vector embedding may be the same as that used to convert the fact captions to vector embeddings. For example, a pre-trained encoding model, such as SBERT, may be used to convert a user query to a corresponding vector embedding. Using a contextual similarity search to identify fact captions (e.g., represented as vector embeddings) relevant to the user query (e.g., represented as vector embeddings), a set of relevant facts (e.g., 150 to 200 facts) are extracted. Such relevant facts that correspond or match with the user query can be defined as a set of relevant facts to the user query. In some cases, to identify relevant facts, a key phrase search can be performed. In this regard, key phrases can be extracted from the query for use in performing the search. In other cases, the entire user query is used to perform the similarity search to identify relevant facts. In yet other cases, a similarity search can be performed using both key phrases and the entire user query to identify relevant facts. The similarity search (e.g., cosine similarity search) may generate similarity scores between the data facts and the user query (e.g., as represented via vector embeddings), which are then used to select relevant facts.

FIG. 4 provides an example algorithm for relevant fact extraction. In the example algorithm 400, various inputs 402 are obtained. In this example, the input includes an encoded fact corpus (e.g., embeddings of fact captions), a user query (e.g., identified via tokens or words), an encoding model, and an indication of a number of facts to retrieve. Any encoding model may be used. As one example, SBERT encoding model may be specified. The number of facts to identify as relevant may be any number (e.g., 150). In some cases, a range of numbers may be specified (e.g., 150-200 facts). In the first operation, at 404, the query is encoded, for example, into a vector embedding for use in performing a similarity search. In the second operation, at 406, key phrases are extracted from the query and encoded for use in performing a similarity search. In the third operation, at 408, a similarity search (e.g., cosine similarity) is performed to identify a top N similar or relevant facts to the encoded query. In the fourth operation, at 410, a similarity search (e.g., cosine similarity) is performed to identify additional facts similar or relevant to the encoded key phrase(s) from the query. In this way, additional facts are retrieved via key phrase-based similarity search (e.g., 5 facts per key phrase). In the fifth operation, at 412, a filter is applied to discard or remove common facts among the retrieved facts (e.g., from the keyword search and the query search). At 414, the facts identified as similar are sorted based on similarity to the user query (e.g., decreasing order of similarity). As such, the set of operations 404-414 provide, as output 416, a list of top N and some additional facts (e.g., derived via key phrase-based searches and the entire query-based similarity searches) as the relevant fact set, $F_R$.

Using the relevant facts identified from the user query, a data story is generated. The data story may include any number of facts, or fact visualizations (e.g., 15). In this regard, in some cases, a particular set of relevant facts, also referred to herein as data story facts, can be selected from among the relevant facts for inclusion in the data story. The facts to include in the data story may be selected from the relevant facts using any number of methods. In one example, maximum margin relevance (MMR) is used to select a number (e.g., predetermined number or number that exceeds a threshold) of facts, from the relevant facts, to include in the data story. MMR is a diversity-based ranking technique that maximizes the relevance and novelty of top-ranked items, such as the identified relevant facts. MMR generally reduces the redundancy of results while maintaining query relevance of results for already ranked relevant facts. In this regard, MMR selects facts according to a combined criterion of query relevance and novelty of information. In embodiments, novelty of information measures a degree of dissimilarity between the document being considered and previously selected ones already in the ranked list. With MMR, a relevance parameter, λ, can be set to reflect a desired relevance. The relevance parameter may vary between 0 and 1, with a higher value indicating more relevance, thereby focusing more on the similarity scores, and a lower value indicating more diversity selected among the facts. For example, a relevance parameter of 0.5 indicates a balance between facts being similar to the user query as well diversity of facts that are different from one another. In another example, a text rank algorithm may be used to perform extractive summarization to retrieve data story facts from a set of relevant facts. Text rank generally measures the relationship between two or more words.

As an example of selecting facts for a data story from a set of relevant facts, assume a user query q is provided. The user query q is converted to a vector embedding using SBERT, such that the user query can be used to search a fact corpus including vector embeddings representing captions of facts. Using the vector embedding of the user query, a key phrase-based and an entire query-based similarity search is performed, thereby resulting in retrieving about 150-200 relevant facts from the precomputed fact corpus. Using the relevant facts, an MMR algorithm is used to select about 15 facts for including in a data story. Using an MMR algorithm ensures both relevance and diversity in the data story.

FIG. 5 provides an example algorithm for selecting facts for a data story. In this example algorithm 500, a set of inputs 502 is obtained. The input 502 includes a relevant fact set, a number of facts to be presented in a data story, a relevance parameter, and a query. At 504, an MMR algorithm is used to select the number of facts from the relevant fact set conditioned on the user query and the relevance parameter. The selected facts, or data story facts, derived from the relevant fact set based on MMR scores are provided as output 506.

In accordance with selecting a set of relevant facts (e.g., 15 facts), a data story is generated by sequentially arranging the selected relevant facts, or a portion thereof, for ensuring better coherence among the facts in the data story. In this regard, to present a coherent data story, the data story generator 222 can coherently arrange the facts in the data story. Generating the sequence of relevant facts, or coherently arranging the facts, may be performed in any of a number of ways. As one example, a Jaccard similarity matrix between fact tuples in the data story may be generated. Thereafter, starting with a first fact amongst D facts (e.g., from selected relevant facts), a next most similar fact to the fact already selected may be identified one by one using the similarity matrix.

By way of example, coherence of a data story can be calculated based on Jaccard similarity between consecutive fact tuples $f_i$ and $f_j$ selected for a data story. In this regard, for a data story generated, pairwise consecutive Jaccard similarity between fact tuples are determined and averaged to determine coherence of the data story. A higher coherence implies better logical flow between consecutive facts. In operation, initially, a most relevant fact may be identified. The most relevant fact may be identified using the maximum similarity score associated with the user query. Jaccard similarity can be determined between the most relevant fact (e.g., in association with the user query) and the remaining facts. The fact, among the remaining facts, that is most similar to the previous fact, is selected as a next data fact to present in the data story. The newly selected fact can then be used to identify a next fact based on Jaccard similarities to the newly selected fact. This iterative approach can be applied until a sequential order of data facts is determined. Using this approach, facts can be arranged so there is more coherence or similarity between adjacently positioned facts in the data story.

In accordance with generating a data story, the data story manager 222 provides the data story, for example, for display to a user. In this regard, the data story is presented. In embodiments, the data story is presented in a manner that allows a user to provide relevance feedback, which can be used to refine the data story as well as generate a data summary, as described below.

In some cases, based on contextual similarity search, data facts in the presented data story may not be relevant to or desired by the user (e.g., user query). In this way, embodiments described herein may receive user feedback in relation to relevance of the data facts and use such feedback to refine the data story. As such, the user query refiner 224 is used to refine the user query based on user feedback, also referred to herein as relevance feedback. In this regard, in accordance with presenting a data story, user feedback pertaining to the data story can be obtained. In particular, feedback associated with relevance of the data story, or portions thereof (e.g., fact visualizations), can be obtained. For example, a user may view various fact visualizations of a data story and provide feedback of fact visualizations the user does not deem relevant to the user query. As described herein, the refined user query may be used, for instance, to refine the data story.

User feedback may be elicited and/or provided in any number of ways. In some cases, each fact visualization may be presented in association with a relevance indicator(s) that can be used to indicate whether, or an extent to which, the fact visualization, or a portion thereof, is relevant (e.g., to the user query). For instance, relevance feedback may enable refining a data story based on binary feedback according to user interests. As an example, an "accept" relevance indicator may indicate the fact visualization is relevant, while a "decline" relevance indicator may indicate the fact visualization is irrelevant. In some cases, only a single relevance indicator may be presented, for example, that can be selected to indicate that the data fact is not relevant. In yet other cases, relevance indicators may be variable to select or input different levels or extents of relevance. For instance, a sliding scale may be presented and manipulated to indicate an extent of relevance to a user query.

Relevance feedback may be provided in association with a type of data fact or other attribute associated with the data fact (e.g., visual, caption, data type, etc.). In this regard, relevance can be in terms of "types" of facts a user is interested in, or attributes of the data a user is interested in. In some embodiments, the particular attribute for which the relevance feedback is provided may be specified by the user or identified based on the elicitation for the feedback. For example, a relevance indicator may specify a particular attribute for which the relevance feedback pertains. In other embodiments, the particular attribute for which the relevance feedback is provided may be automatically identified or determined.

Various implementations may be employed to refine a user query based on relevance feedback. In embodiments, the query is refined (e.g., mathematically refined) in the vector space. In some embodiments, to refine a user query based on relevance feedback, Rocchio's algorithm is used:

$$\vec{Q}_{opt} = \frac{1}{|C_r|} \sum_{\vec{d}_j \in C_r} \vec{d}_j - \frac{1}{N - |C_r|} \sum_{\vec{d}_j \notin C_r} \vec{d}_j$$

wherein $\vec{Q}_{opt}$ represents a modified query vector, which is based on a difference between centroids of relevant and non-relevant documents. In operation, the modified query vector is optimized to have more similarity with the relevant set and minimize similarity with the non-relevant set of documents.

In accordance with obtaining relevance feedback, the user query refiner 224 can refine the user query to adapt to the relevance feedback. For instance, assume a user selected a particular data fact that is irrelevant or uninteresting to the user. In such a case, the user query (e.g., in the form of a vector embedding) is refined to avoid or indicate a lack of interest in the particular data fact such the data fact may be removed from the data story. Based on the refined user query, a refined data story may be generated. In this regard, a new set of facts can be identified based on a refined user query. In this regard, the process may return to the data story generator 222 to generate a data story using the refined user query. For example, the refined user query may be used to identify a relevant set of facts. Using the relevant fact set, a particular set of facts can be selected for use in the data story. This iterative process may continue until a desired data story is attained.

FIG. 6 provides an example algorithm for refining a data story, in accordance with some embodiments described herein. In this example algorithm, input 602 includes the data story and the initial user query q. Input 602 also includes the relevance feedback. In this example, the relevance feedback is binary feedback, f=[0, 1, 1, 0, . . . , 1]. The binary feedback may correspond with each data fact in the data story. For example, a 0 value may indicate an undesired fact visualization, and a 1 value may indicate a desired fact visualization. Based on the input 602, the data story can be refined using functionalities 604 described herein. In particular, Rocchio's algorithm, as described above, is used to update the user query vector. In accordance with updating the user query vector, the data story generator 222 can be used to generate a new data story based on the updated user query. The new data story can then be presented to the user. In this way, the output 606 includes a refined data story with facts more relevant to the user's intent or interest.

FIG. 7 provides an example of using user relevance feedback to refine a data story. In FIG. 7, an example illustrates a sequence of data facts 702 used to form a data story related to an Avocado Sales dataset based on an initial user query of "Some trends in Avocado Sales over years." In this example, assume the user is interested in trends, but in the initial sequence of data facts 702 used to form a data story, a lot of types of facts are presented which are not trend types of facts. As such, assume the user provided negative feedback in relation to the non-trend type facts. In such a case, the user query is updated and a new series of data facts 704 is formed in which all the facts are related to the trends of the sale of bags. As such, relevance feedback improves the relevance of the data story, thus making the system more interactive.

The data summary manager 226 is generally configured to generate a data summary associated with a dataset and/or a data story generated in association with the dataset. A data summary generally refers to a summary of data. Such a summary can be in a natural language form and be more comprehensive than a data story. At a high level, the data summary manager 226 uses the dataset associated with the data story, including the various data facts in the data story, to generate a data summary. As one example, a large language model may be used to facilitate generation of data summaries. In such a case, the data story, including the various data facts in the data story, can be used in a prompt as input to the LLM to generate, as output, a data summary.

Data summary generation may be performed in any number of ways. In some cases, data summary manager 226 may include a prompt generator 230, a data summary generator 232, and a data summary analyzer 234. As can be appreciated, additional or alternative components may be used to manage data summaries, in accordance with various embodiments described herein. In some cases, data summary generation may be initiated automatically, for example, upon obtaining a user query, obtaining a refined user query, generating a data story, etc. In other cases, data summary generation may be initiated based on a user request. For example, in accordance with presenting a data story, a user may select (e.g., via a prompt, link, menu, etc.) to generate and/or view a data summary. Such a selection indicating a preference to view a data summary can initiate or trigger the data summary manager 226 to generate a corresponding data summary.

The prompt generator 230 generates prompts that may be used to initiate generation of data summaries. A prompt generally refers to an input, such as an input text, that can be provided to a data summary generator 232, such as an LLM, to generate an output in the form of a data summary(s). In embodiments, the prompt generally includes text to influence a machine learning model, such as an LLM, to generate text having a desired content and structure. A prompt typically includes text given to a machine learning model to be completed. In this regard, a prompt generally includes instructions and, in some cases, data to use in performing the analysis and/or examples of desired output. In accordance with embodiments described herein, a prompt may include various types of text data. In particular, a prompt includes text data corresponding to facts to use to generate a data summary. For example, data facts selected for a data story, or data associated therewith (e.g., fact captions), may be included in a prompt as input to an LLM to generate a data summary.

In various implementations, to facilitate a more enriched data summary, a more extensive set of facts may be used. In this regard, for input into the LLM, additional facts may be used to supplement the facts in the data story. As previously described, based on a user query or refined user query, a relevant fact set $F_R$ is formed, which may result in around 150 to 200 facts. In this regard, facts identified as relevant but not used in the data story may be additionally used as input into the LLM.

To make facts more informative, contextual facts corresponding with the relevant facts can be generated. A contextual fact generally refers to a fact that includes context associated with the fact. In this regard, additional contextual data for each fact $f_i$ in the set of relevant facts $F_R$ is identified and appended, supplemented, or aggregated with the corresponding fact. Contextual data may be in various formats. As one example, contextual data may be in the form of numerical or categorical values related to various attributes associated with the fact tuple, such as, for example, subspaces, measures, breakdowns, aggregates, focus, etc. In this regard, the prompt generator 228 may obtain contextual data associated with each fact (e.g., via a data store) and append the contextual data to the corresponding fact caption (e.g., obtained via a data store). Accordingly, a contextual fact can be generated for each fact, with each contextual fact including a fact caption and contextual data associated with the corresponding fact.

As such, the prompt generator 230 may include contextual facts in the prompt. For example, contextual facts can be generated for the identified relevant facts (e.g., 150 to 200 facts relevant to the user query or refined user query) and included in a prompt for generating a data story. By way of example only, and with reference to FIG. 8, FIG. 8 includes an example contextual fact 808 that may be included in a prompt. In FIG. 8, a fact tuple 802 is initially generated. The fact tuple 802 includes various aspects of the fact tuple. A fact caption 804 is generated for the fact tuple. In embodiments, the fact caption 804 is generated via a template. The fact contextual data 806 is generated. The fact contextual data 806 includes numerals associated with the fact tuple. The contextual fact 808 is generated by concatenating the fact caption and the fact contextual data. The contextual fact 808 can be used as input for generating a data summary.

In embodiments, the prompt generator 230 is configured to select a set of content or text, such as facts or contextual facts, for which to use to generate the prompt. Contextual facts, and/or other text data, may be selected based on any number or type of criteria. As one example, contextual facts may be selected to be under a maximum number of tokens required by a data summary generator, such as an LLM. For example, assume an LLM includes a 3,000-token limit. In such a case, text data totaling less than the 3,000-token limit may be selected. In this regard, prompts may have a size limit, thereby limiting the number of contextual facts included in the prompt. As such, in some cases, using all relevant facts in $F_R$ (e.g., extracted via a similarity search) as well as the corresponding contextual data may not be possible to be used as a prompt to an LLM due to size limitations of an LLM. Hence, it is necessary to select an optimal set of facts for feeding to the LLM for obtaining data summary.

Accordingly, in embodiments, the prompt generator 230 may be configured to select the contextual facts to include in a prompt to generate a data summary. To identify contextual facts to include, a fact score may be used. Such a fact score may indicate an extent or measure of some aspect for assessing optimal facts to include in the prompt. For example, a fact score may indicate relevance to a user query, informativeness, diversity, and/or the like.

In some embodiments, contextual facts that provide diversity and informativeness are desired for selection. In this regard, the prompt generator 230 may generate a fact score in association with each fact and/or corresponding contextual fact. For instance, for each fact of the relevant facts, $f_i \in F_R$, a fact score is generated and assigned. Such a fact score can be based on diversity of the fact in the set of all relevant facts extracted via similarity search and/or the importance score of the fact. A fact score, $s_i$, for a fact may be represented as:

$$s_i = -\log\left(\text{self}_{bleu(f_i)}\right) + I_N(f_i).$$

In this fact score, $\text{self}_{bleu}$ score of fact $f_i$ is calculated considering the set of relevant facts $F_R$ as the reference corpus. Self-BLEU refers to a metric used to evaluate the diversity of generated texts. Such a score can be calculated by treating one sentence as a hypothesis and the others as a reference and, thereafter, calculating the BLEU score for every generated sentence. A higher $\text{self}_{bleu}$ score of $f_i$ denotes lesser diversity, which implies there are a lot of other facts in $F_R$, similar to $f_i$. On the other hand, a lower $\text{self}_{bleu}$ of fact $f_i$ indicates a higher diversity, implying $f_i$ is quite unique amongst facts in the set of relevant facts, $F_R$.

$I_N(f_i)$ is the averaged normalized importance score of fact $f_i$, as described herein. In this regard, the previously determined normalized importance score may be referenced (e.g., from data store 212) and used to generate a fact score. Using this approach to generate a fact score, such scoring considers both diversity amongst selected facts as well as their importance scores. As described, diversity helps in avoiding redundancy in fact selection. For example, and with reference to FIG. 9, as shown, sentence 5 902 and sentence 7 904 are unique amongst all 15 sentences, which is indeed reflected by their low self-BLEU scores.

As described, the fact scores associated with various facts, such as relevant facts, may be used to select which corresponding contextual facts to include in a model prompt. In some cases, contextual facts are selected in accordance with a set of facts having the highest fact scores or, alternatively, the lowest fact scores. In other cases, selection of optimal facts is posed as an Integer Linear Programming (ILP) problem. Each fact $f_i$ in a set of relevant facts, $F_R$, is assigned a fact score, as described above. A constraint to the optimization problem is the token limit of the LLM (e.g., 3,000 for Chat GPT). In this way, ILP can be implemented to select contextual facts to include in the model prompt to generate a data summary.

FIG. 10 provides one example of an algorithm that may be implemented to select contextual facts for a prompt to generate a data summary. In this algorithm, inputs 1002 are obtained. The inputs include a set of relevant facts (e.g., extracted via a similarity search) and a token limit of an LLM being used to generate a data summary. A set of operations 1004 are performed to generate an output. In this regard, for each fact in a set of relevant facts, the fact score is calculated. For each fact in the set of relevant facts, the length of tokens in the contextual fact is determined. In this way, the length of tokens of the fact caption and the length of tokens of the contextual data are aggregated. Thereafter, ILP is used to determine an optimal fact set containing K facts such that the sum of scores is the maximum, and the length of each fact summed up is less than or equal to a certain limit T, where T is the token limit of the LLM. Such an optimization can result in output 1006 having an optimal fact set $F_0$ containing K facts and corresponding contextual data.

Although generally described as using tokens (e.g., pieces of words, individual sets of letters within words, spaces between words, and/or other natural language symbols or characters), for input size, as can be appreciated, other input sizes may be used and not necessarily be based on token sequence length, but other data size parameters, such as bytes, number of words, etc.

In accordance with identifying an optimal set of facts, or contextual facts, such information can be included in a prompt. In addition to the facts, or contextual facts, the prompt may include additional information. For example, to minimize hallucinations, the prompt can include a unique value assigned to each fact, or contextual fact, in the prompt. For example, each fact, or contextual fact, may be assigned a unique value that is indicated via a special token(s). For example, a unique random number may be appended within special tokens of @ and #, or other tokens. In this regard, the prompt can include explicit instructions to the LLM to specify the unique index value. In this way, the LLM is instructed to cite the corresponding fact it has used to form the summary. For example, the prompt may include an instruction that when including an aspect of information in the data summary, refers to or cites the corresponding fact.

In embodiments, the prompt may also include data context. Data context provides context about the dataset from which the facts, or contextual facts, were formed. For example, assume you have a dataset related to the Olympics in 2020 in Tokyo. In this regard, the prompt may include a data context indicating that the dataset includes information about the Olympics in 2020 in Tokyo, as well as the columns of data included therein. Providing data context provides the LLM with more information related to the data, thereby enabling the LLM to better understand the data and perform more optimally.

Other types of information that may be included in a prompt may include an instruction to generate a data summary, user data associated with a user viewing, or to view, the data summary, and/or the like, depending on the desired implementation or output. In accordance with embodiments herein, the instruction can specify to generate one or more data summaries for the provided or corresponding content.

In addition, a prompt may also include output attributes. Output attributes generally indicate desired aspects associated with an output, such as a data summary. For example, an output attribute may indicate a target temperature to be associated with the output. A temperature refers to a hyperparameter used to control the randomness of predictions. Generally, a low temperature makes the model more confident, while a higher temperature makes the model less confident. Stated differently, a higher temperature can result in more random output, which can be considered more creative. On the other hand, a lower temperature generally results in a more deterministic and focused output. A temperature may be a default value, a value based on user input, or a determined value. As another example, an output attribute may indicate a length of output. For example, a prompt may include an instruction for a desired number of paragraphs or sentences (e.g., in association with the data story). As another example, a prompt may include an instruction for a maximum number of characters or a target range of characters. As another example, an output attribute may indicate a number of facts to include in the data summary. As another example, an output attribute may indicate a target language for generating the output. For example, the text data may be provided in one language, and an output attribute may indicate to generate the output in another language. Any other instructions indicating a desired output are contemplated within embodiments of the present technology.

The prompt generator 228 may format the prompt in a particular form or data structure. One example of a data structure for a prompt is as follows:

```
{Instruction to Generate a Data Summary
{Data Context
{Set of Contextual Facts and Corresponding Unique Source Indicators
  {Contextual Fact 1; Unique ID 1
  {Contextual Fact 2; Unique ID 2
  {Contextual Fact N; Unique ID N
```

With reference to FIG. 11, FIG. 11 provides an example prompt 1100 used to generate a data summary. In this example, assume the query input by a user is "Some insights into the performance of women in various sports." In this example, the prompt includes data context 1102. In this example, the data context 1102 includes the dataset corresponding with the facts and an indication of the user query. The prompt also includes an instruction 1104 to generate a data story and to include the contextual data included in the contextual facts in the data summary. The prompt further includes a citation instruction 1106 to include the corresponding unique value or source indicator in the data story. The set of contextual facts 1108 identified or selected for the prompt are included in the prompt. As described, a contextual fact includes the fact caption, corresponding context data, and a unique value representing a source(s). For example, contextual fact 1110 includes a fact caption 1112, context data 1114, and a source indicator 1116.

The data summary generator 232 is generally configured to identify or generate data summaries. In this regard, the data summary generator 232 utilizes content in the form of text to generate a data summary(s) associated with a set of facts, or contextual facts. In embodiments, the data summary generator 232 takes, as input, a prompt or set of prompts generated by the prompt generator 230. Based on the prompt, the data summary generator 232 can generate a data summary or set of data summaries associated with a fact indicated in the prompt. For example, assume a prompt includes a set of contextual facts associated with a dataset. In such a case, the data summary generator 232 generates a data summary based on the set of contextual facts included in the prompt.

As described, a data summary generally refers to a summary of a dataset representing various facts. In embodiments, the data summary is provided in a natural language format. The data summary can include any amount of text providing a natural language description as well as any number of visualizations desired for use in summarizing the data.

The data summary generator 232 may be or include any number of machine learning models or technologies. In some embodiments, the machine learning model is a Large Language Model (LLM). A language model is a statistical and probabilistic tool that determines the probability of a given sequence of words occurring in a sentence (e.g., via next sentence prediction [NSP] or minimal learning machine [MLM]). In this way, it is a tool that is trained to predict the next word in a sentence. A language model is called a large language model when it is trained on an enormous amount of data. Some examples of LLMs are OPT, FLAN-T5, BART, GOOGLE's BERT, and OpenAI's GPT-2, GPT-3, and GPT-4. For instance, GPT-3, is a large language model with 175 billion parameters trained on 570 gigabytes of text. These models have capabilities ranging from writing a simple essay to generating complex computer codes-all with limited to no supervision. Accordingly, an LLM is a deep neural network that is very large (billions to hundreds of billions of parameters) and understands, processes, and produces human natural language by being trained on massive amounts of text. In embodiments, an LLM generates representations of text, acquires world knowledge, and/or develops generative capabilities.

As such, as described herein, the data summary generator 232, in the form of an LLM, can obtain the prompt and, using such information in the prompt, generate a data summary(s) for a set of facts or contextual facts. In some embodiments, the data summary generator 230 takes on the form of an LLM, but various other machine learning models can additionally or alternatively be used.

In embodiments, as described herein, the data summary generator 232 may be instructed to include the source indicator to indicate the source or reference associated with the contextual fact. For example, as described, for each contextual fact identified in the selected optimal set of contextual facts, a unique random number may be appended thereto to indicate a source reference. In generating the data summary, the source indicator may be included in association with the corresponding text to indicate the corresponding contextual fact, or fact, associated with the text in the data summary. In some cases, the data summary generator 232 may use the source indicator to generate a link or reference a corresponding fact, contextual fact, fact caption, and/or fact visualizations. For example, in association with a source indicator, a link may be generated that links to or indicates a fact visualization, including a fact caption, that corresponds with the text. In embodiments, the source indicator may be used to look up or identify an appropriate fact citation and/or obtain fact data that corresponds therewith (e.g., a fact visualization). Providing source indicators or citations facilitates prevention of an LLM from hallucinating and ensures factuality. Further, referencing and obtaining the corresponding fact and/or fact visualization enables the data summary to be more engaging and comprehensive.

The data summary analyzer 234 is generally configured to analyze data summaries. In some cases, the data summary analyzer 234 may analyze the data summary to identify and/or perform any post-processing techniques. In this way, in accordance with obtaining a data summary, for example, via data summary generator 232, the data summary analyzer 234 may analyze the data summary to generate a data summary score(s) associated with the data summary. Various aspects or characteristics associated with the data summary may be measured or scored. For example, coherence, diversity, informativeness, and/or factuality may be measured or scored in association with a generated data summary.

Coherence of a data summary refers to its clarity, logical flow, and ease of understanding due to well-connected ideas and/or organized structure. In one embodiment, unsupervised text coherence scoring based on graph construction may be used to generate a coherence score associated with a data summary. In the graph construction, edges can be established between semantically similar sentences represented by vertices. Sentence similarity is calculated based on the cosine similarity of semantic vectors representing sentences. In this regard, to measure coherence, the data summary analyzer 234 may construct a graph with nodes as sentences and edges as similarities between nodes. A threshold can be set to decide on the existence of a node for a given pair of edges. The coherence can be calculated as:

$$tc = \frac{1}{N}\sum_{i=1}^{N}\frac{1}{L_i}\sum_{k=1}^{L_i}\text{weight}\ (e_{ik})$$

wherein N is the number of sentences in the summary, $L_i$ is the number of outgoing edges from the vertex $v_i$ (sentence$_i$), and $e_{ik}$ is the edge between $v_i$ and $v_k$, which is calculated by the cosine similarity between $v_i$ and $v_k$. In this regard, $e_{ik}$=cosine$_{sim\ (v_i,\ v_k)}$ and $e_{ik} \geq$ threshold. Threshold values may be, for example, 0.4, 0.5, 0.6, etc.

For evaluating the diversity of a generated data summary, a self-bleu score of the data summary may be generated and used. The lower the self-bleu score is, the higher the diversity. Self-bleu scores can range from 0 to 1.

For evaluating the informativeness of a generated data summary, average normalized importance scores of facts cited by the LLM in the data summary may be generated and used. One example for determining informativeness includes:

$$I_{summ} = \frac{\sum_{i=1}^{D}(I_N(f_i) * c_i)}{\sum_{i=1}^{D} c_i},$$

wherein $c_i$=1, if fact $f_i$ is cited by an LLM in the summary, and $I_N$ ($f_i$) is normalized importance score fact $f_i$, as previously described.

Factuality refers to the correctness of information provided in a data summary. In some embodiments, factuality in the data summary can be defined by the ratio of facts cited by the LLM correctly (e.g., a corresponding sentence in the summary appropriately describes the fact) to the total number of facts cited by the LLM.

FIG. 12 provides an example algorithm for generating a data summary and analyzing the generated data summary. In this example, the input 1202 is obtained. The input 1202 may include the optimal fact set, the dataset context, and/or instructions. To generate a data summary, operations 1204 may be performed. In this regard, a source indicator may be supplemented or added to each contextual fact. A prompt is generated by concatenating data context, instructions, and contextual facts. The data summary is generated and obtained, as output, from the LLM. Thereafter, post-processing can occur to obtain citations for referring to corresponding facts. For example, a source indicator associated with text in the data summary can be used to look up or identify a citation or reference to a fact or fact visualization, which may be incorporated into the data summary. Thereafter, various data summary scores for the data summary can be generated. As shown, the generated data summary, including text and visualizations describing various facts, can be provided as output 1206.

With reference back to FIG. 2, the data provider 234 is generally configured to provide data, such as a data story and/or data summary provider. In this regard, the data provider 234 can provide a data story and/or data summary to a user device (e.g., user device 110 of FIG. 1), a data analysis service (e.g., data analysis service 118 of FIG. 1), and/or a data store (e.g., data store 214 of FIG. 2) for utilization by another device or component.

In some cases, upon generating a data story(s) and/or data summary(s), the data provider 234 can provide such data, for example, for display via a user device. To this end, in cases in which the data fact engine 212 is remote from the user device, the data provider 234 may provide a data story(s) and/or data summary(s) to a user device for display to a user interested in the content.

Alternatively or additionally, the data story and/or data summary may be provided to a data store for storage or another component or service, such as an analysis service (e.g., data analysis service 118 of FIG. 1). Such a component or service may then provide the data story and/or data summary for display, for example, via a user device.

The data story and/or data summary may be provided for display in any number of ways. In some examples, the data story and/or data summary may be automatically displayed upon being generated (e.g., concurrently displayed). For example, a data story may be presented with a corresponding data summary. In other cases, a user may select to view the data story and/or data summary. For instance, a link may be presented that, if selected, presents the data story and/or data summary (e.g., integrated with the content, or provided in a separate window or pop-up text box). As one example, a data story may be presented along with a link to open or present a corresponding data summary. Based on selection of the link, the data summary may be presented.

Figure 13A:
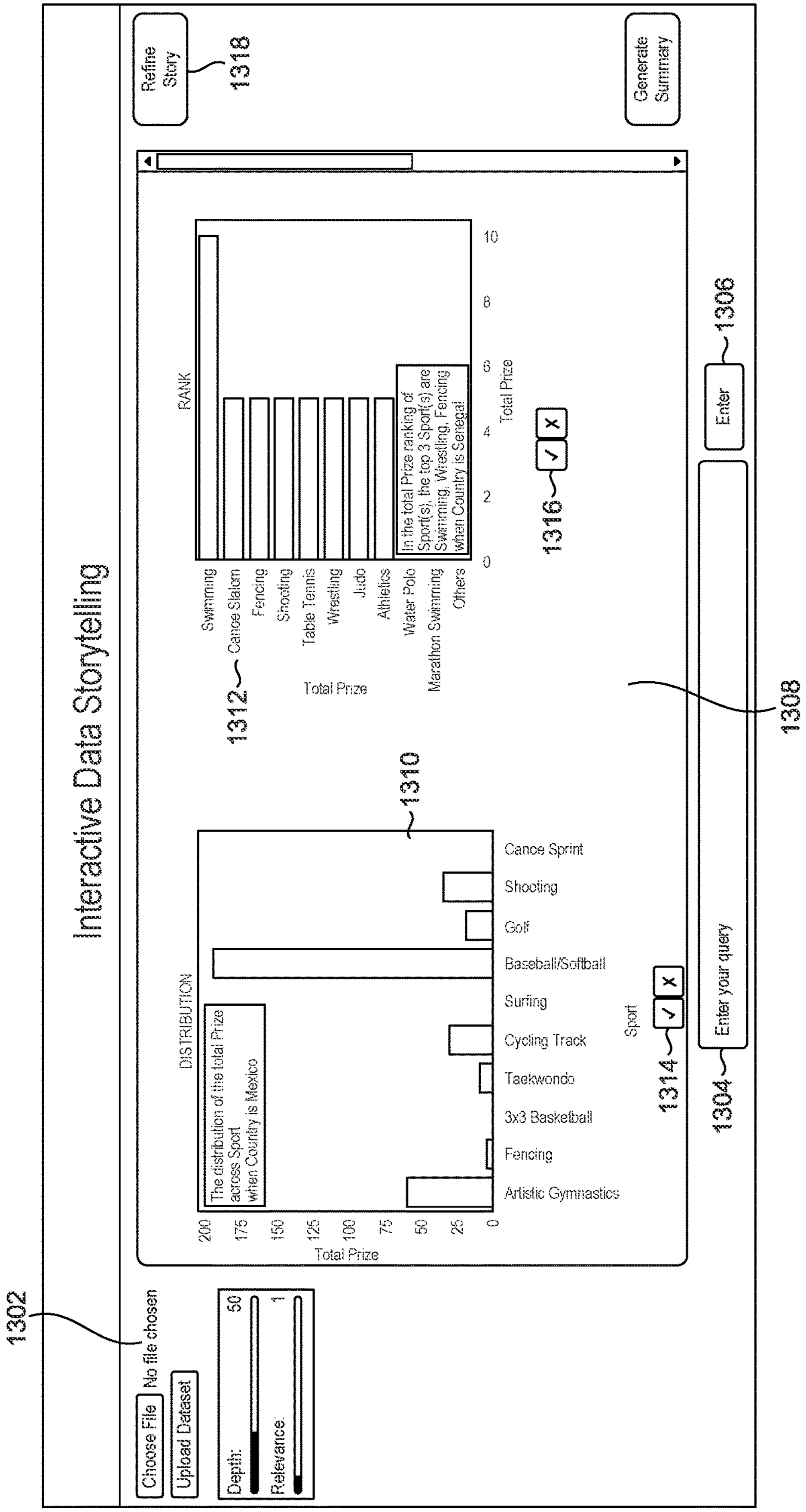
FIGS. 13A-13C provide example user interfaces presenting a data story and a data summary and user interaction therewith, in accordance with embodiments described herein.
Figure 13B:
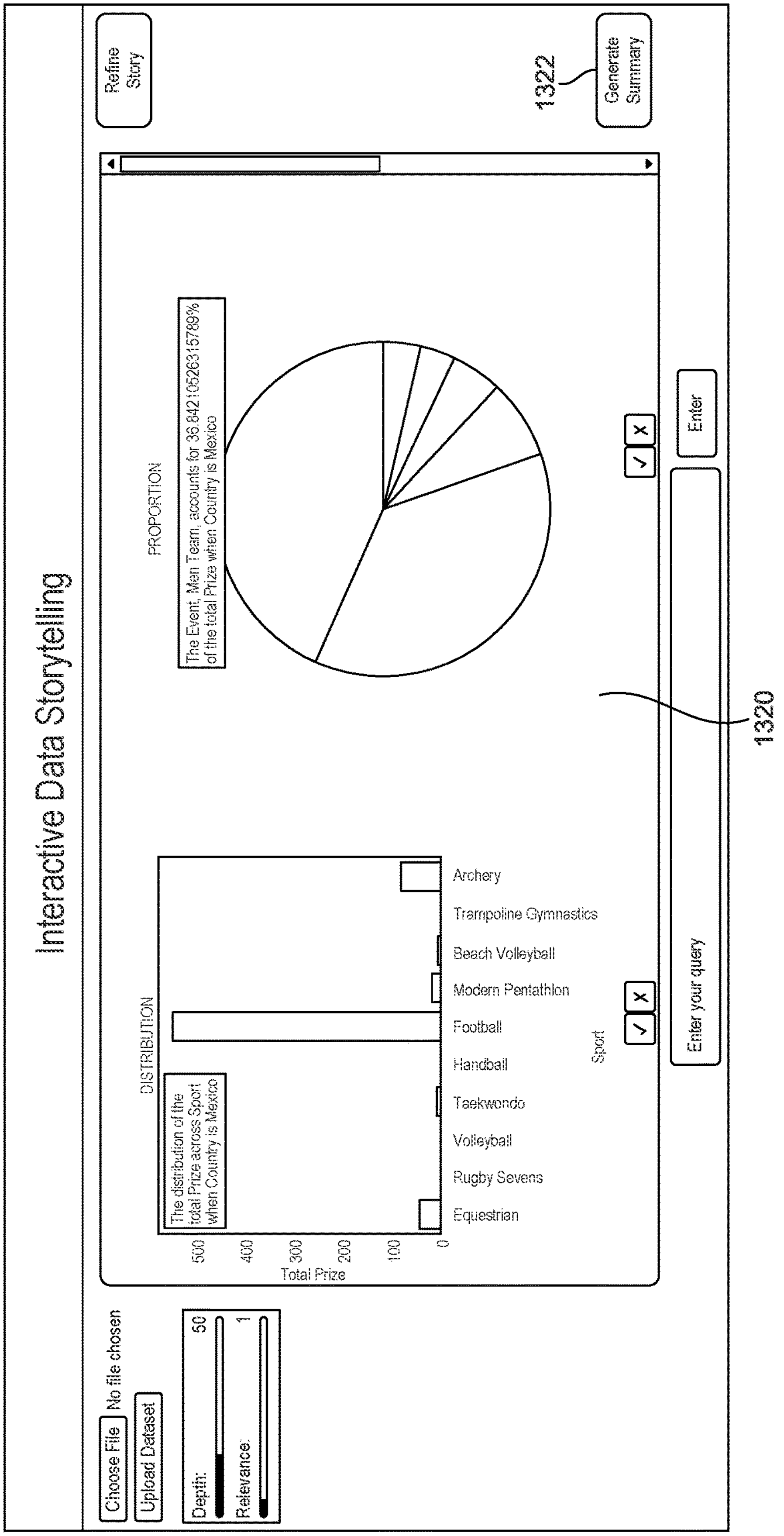
Figure 13C:
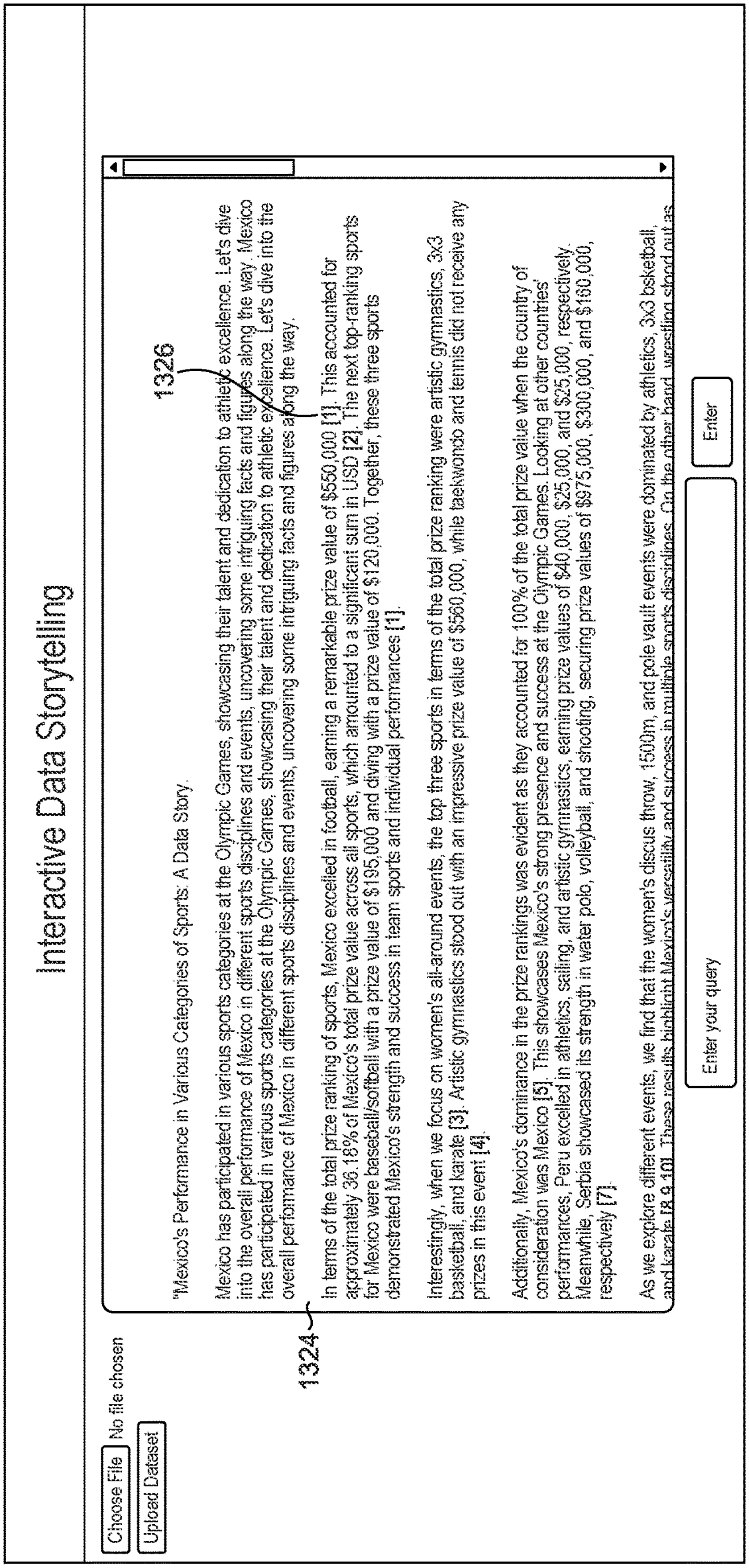

By way of example, and with reference to FIGS. 13A-13C, assume a user inputs, selects, or provides, a dataset 1302, as shown in FIG. 13A. In this example, the dataset 1302 corresponds with Olympics data. Now assume the user inputs the query 1304 that states "What is the performance of Mexico over various sports and events?" and selects enter 1306 to generate a data story. In this example, the interactive data story 1308 includes fact visualizations 1310 and 1312. Although only two fact visualizations are illustrated, any number of fact visualizations may be presented. For example, the user may scroll down to view additional fact visualizations. The fact visualization 1310 is displayed in association with a relevance indicator 1314, and the fact visualization 1312 is displayed in association with a relevance indicator 1316. As described, the user may provide feedback in relation to any of the fact visualizations to indicate a preference or interest related to the corresponding facts. For example, assume a user selects to provide feedback via a relevance indicator(s), such as relevance indicators 1314 and 1316. In such a case, the user may select to refine story 1318.

Based on the user selection to refine story 1318 in accordance with relevance feedback, a refined data story 1320 is presented, as shown in FIG. 13B. As can be appreciated, user feedback can be provided in relation to the refined data story 1320, and the story can be refined in accordance with such feedback. Assume the user is satisfied with the data story 1320. In such a case, the user may select to generate a data summary 1322. The user, however, need not base data summary generation based on satisfaction of the data story. In accordance with selecting to generate a data summary 1322, as shown in FIG. 13C, a data summary 1324 is presented. In this example, the data summary 1324 replaces the data story. However, in other cases, the data summary 1324 may be opened in a new window, presented concurrently with the data story, etc. As shown, the data summary 1324 is presented in natural language and includes more context and details as compared to the data story. The data summary 1324 includes citations indicating the corresponding fact and/or fact visualization. For example, citation 1326 is added to the sentence to indicate a fact corresponding with the text. Assume the user selects the citation 1326. In such a case, the corresponding fact and/or fact visualization may be presented. For instance, in this case, when the user selects the citation 1326, the corresponding data visualization may be presented, as illustrated in FIG. 13B. In FIG. 13B, the first fact visualization illustrates a distribution including $550,000 related to football. Accordingly, the data summary 1324 includes text, with citations, as well as the corresponding fact visualizations, thereby enabling a comprehensive conveyance of information related to the dataset.

Figure 14:
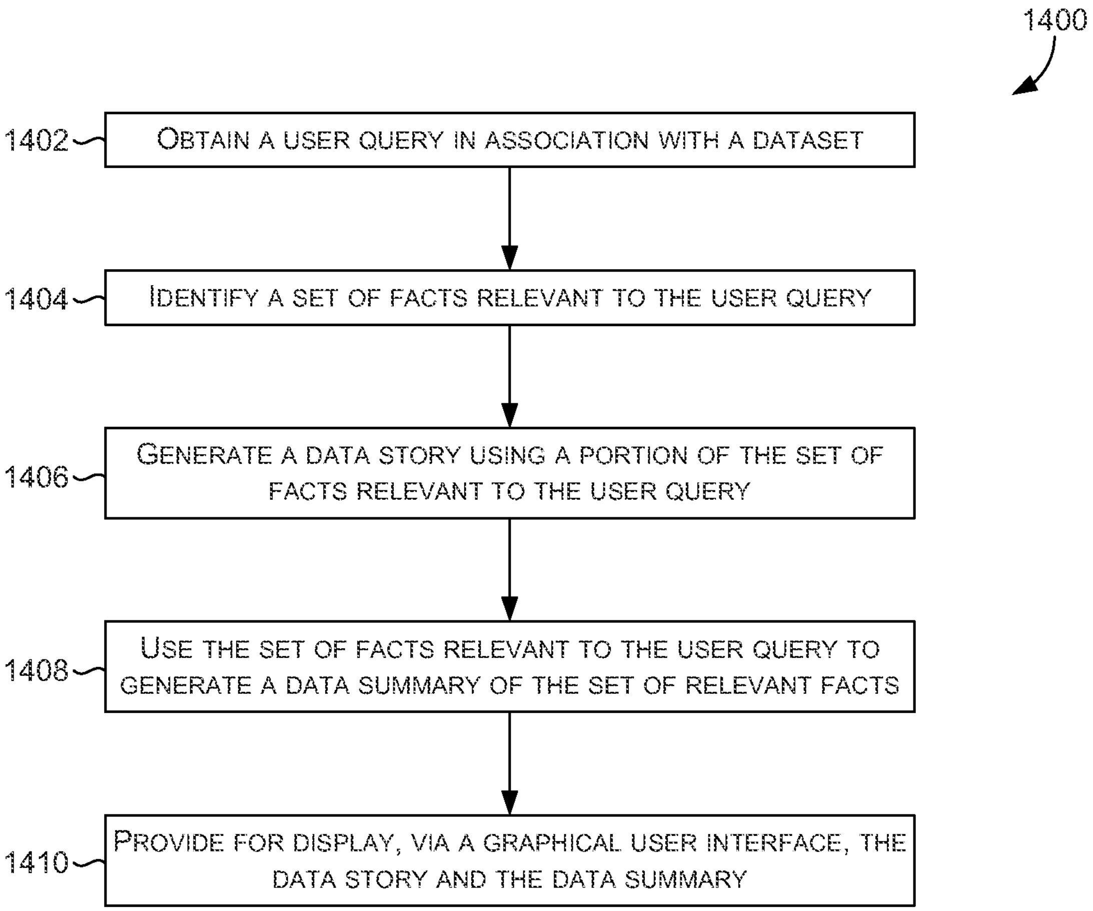
FIG. 14 provides one example for facilitating generation of data stories and data summaries via user queries, in accordance with embodiments described herein.
Figure 15:
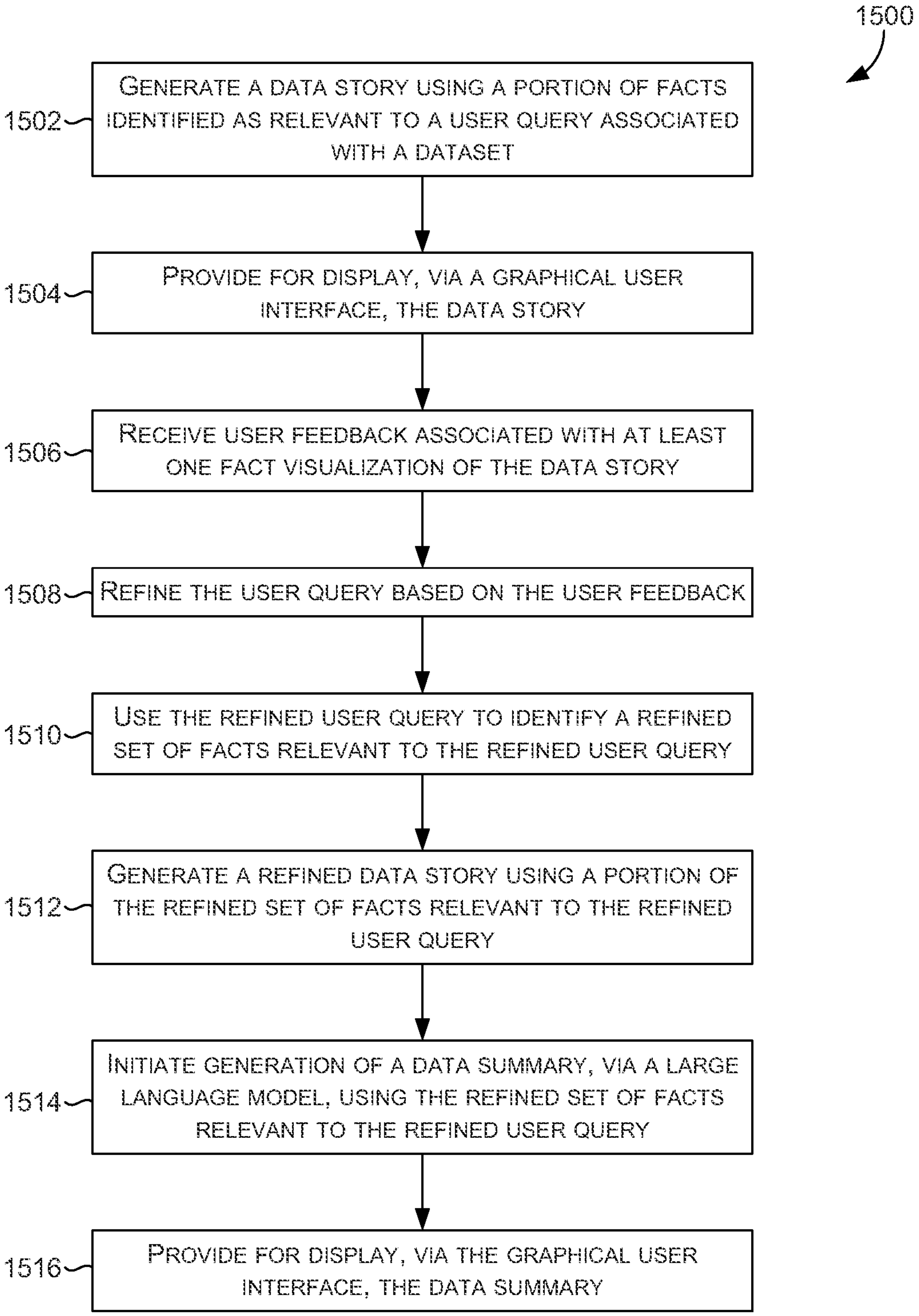
FIG. 15 provides another example for facilitating generation of data stories and data summaries via user queries, in accordance with embodiments described herein.
Figure 16:
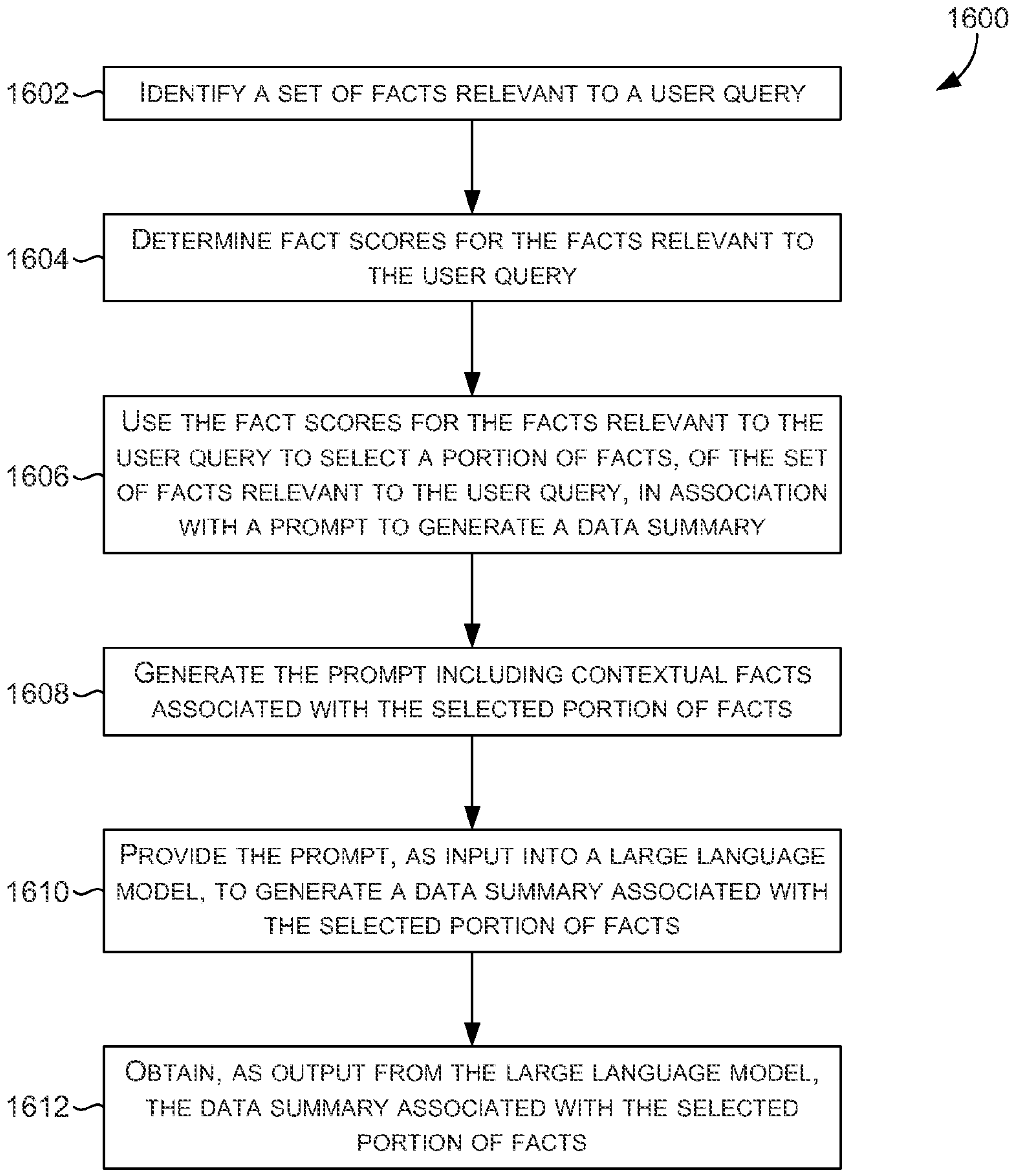
FIG. 16 provides another example facilitating generation of data stories and data summaries via user queries, in accordance with embodiments described herein.

Exemplary Implementations for Facilitating Generation of Data Stories and Data Summaries via User Queries As described, various implementations can be used in accordance with embodiments described herein. FIGS. 14-16 provide methods of facilitating generating of data stories and data summaries via user queries, in accordance with embodiments described herein. The methods 1400, 1500, and 1600 can be performed by a computer device, such as device 1700 described below. The flow diagrams represented in FIGS. 14-16 are intended to be exemplary in nature and not limiting.

Turning initially to method 1400 of FIG. 14, method 1400 is directed to one implementation of facilitating generation of data stories and data summaries via user queries, in accordance with embodiments described herein. Initially, at block 1402, a user query in association with a dataset is obtained. In some cases, the user may specify the dataset and input a user query in association with such a selected dataset. At block 1404, a set of facts relevant to the user query are identified. Relevant facts may be identified using a similarity search. In some cases, a similarity search is performed using one or more key phrases identified from the user query. In other cases, a similarity search is performed using the user query in its entirety in relation to a precomputed fact corpus (e.g., including vector embeddings of fact captions). At block 1406, a data story is generated using a portion of the set of facts relevant to the user query. The data story can include a set of visualizations corresponding with the portion of the set of facts relevant to the user query. The particular portion of relevant facts can be selected for the data story using a maximum margin relevance algorithm. At block 1408, the set of facts relevant to the user query are used to generate a data summary of the set of relevant facts. In embodiments, a data summary is generated using a large language model. In such a case, a prompt can be generated for input into the LLM. The prompt may include contextual facts corresponding with the set of facts relevant to the user query. In some cases, each contextual fact may include a unique source indicator for use in providing a citation in the data summary. At block 1410, the data story and the data summary are provided for display. Such a data story and data summary may be provided based on a user request to view the corresponding data. In some cases, the data story and the data summary may be presented concurrently.

Turning to FIG. 15, method 1500 of FIG. 15 is directed to another example implementation of facilitating generation of data stories and data summaries via user queries, in accordance with embodiments described herein. Initially, at block 1502, a data story is generated using a portion of facts identified as relevant to a user query associated with a dataset. In embodiments, the data story provides fact visualizations corresponding with the portion of facts relevant to the user query. The portion of facts identified as relevant to the user query may be identified by identifying the relevant facts and, thereafter, selecting a portion of such facts for the data story (e.g., using a maximum margin relevance algorithm). At block 1504, the data story is provided for display. At block 1506, user feedback associated with at least one fact visualization of the data story is received. User feedback may be provided as a binary feedback using a relevance indicator associated with a fact visualization(s) of the data story. At block 1508, the user query is refined based on the user feedback. In embodiments, refining the user query is performed based on receiving a user selection to refine the data story. At block 1510, the refined user query is used to identify a refined set of facts relevant to the refined user query. In embodiments, the refined user query is used to perform a similarity search using a fact corpus to identify a refined set of relevant facts. At block 1512, a refined data story is generated using a portion of the refined set of facts relevant to the refined user query. In some embodiments, the refined data story is presented. At block 1514, generation of a data summary is initiated, via a large language model, using the refined set of facts relevant to the refined user query. Such generation of a data summary may be initiated based on a user selection to view a data summary. At block 1516, the data summary is provided for display.

With reference now to FIG. 16, method 1600 of FIG. 16 is directed to another example implementation of facilitating generation of data stories and data summaries via user queries, in accordance with embodiments described herein. At block 1602, a set of facts relevant to a user query is identified. The set of facts may be represented using corresponding fact captions, or vector embeddings thereof. At block 1604, fact scores for the facts relevant to the user query are determined. In some cases, the fact scores incorporate or consider diversity and importance of the corresponding facts. At block 1606, the fact scores for the facts relevant to the user query are used to select a portion of facts, of the set of facts relevant to the user query, in association with a prompt to generate a data summary. In embodiments, an integer linear program is used to select the portion of facts using the fact scores for the facts relevant to the user query. At block 1608, the prompt including contextual facts associated with the selected portion of facts is generated. In some cases, the contextual facts may be generated by concatenating fact captions and context data. The prompt may include additional data. For example, the prompt may include data context and an instruction to generate the data summary. As another example, the prompt may include unique source indicators in association with the contextual facts and an instruction to include the unique source indicators in the data summary. At block 1610, the prompt is provided, as input into a large language model, to generate a data summary associated with the selected portion of facts. At block 1612, the data summary associated with the selected portion of facts is obtained as output from the large language model.

Overview of Exemplary Operating Environment

Having briefly described an overview of aspects of the technology described herein, an exemplary operating environment in which aspects of the technology described herein may be implemented is described below in order to provide a general context for various aspects of the technology described herein.

Figure 17:
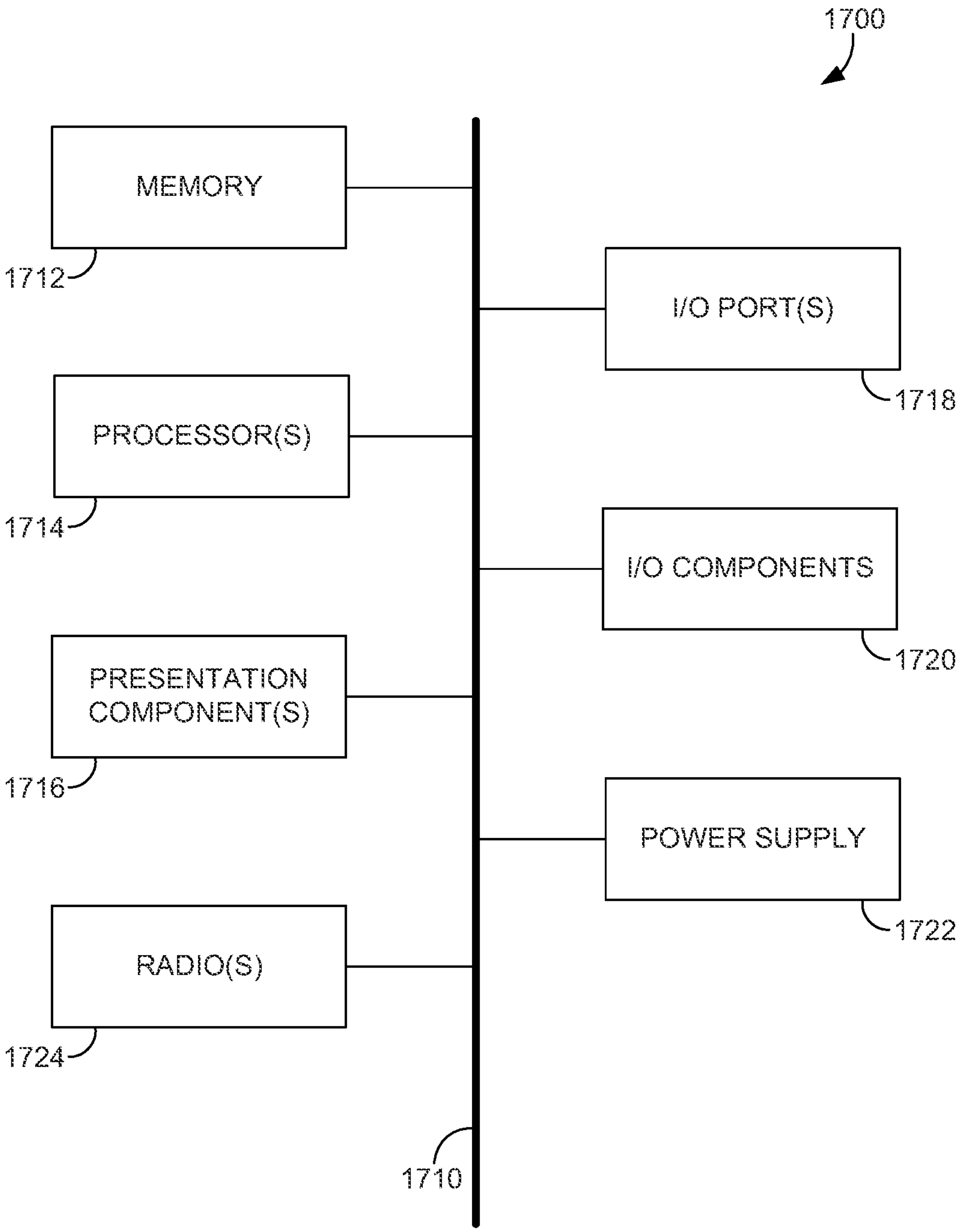
FIG. 17 is a block diagram of an exemplary computing environment suitable for use in implementing aspects of the technology described herein.

Referring to the drawings in general, and initially to FIG. 17 in particular, an exemplary operating environment for implementing aspects of the technology described herein is shown and designated generally as computing device 1700. Computing device 1700 is just one example of a suitable computing environment and is not intended to suggest any limitation as to the scope of use or functionality of the technology described herein, and nor should the computing device 1700 be interpreted as having any dependency or requirement relating to any one or combination of components illustrated.

The technology described herein may be described in the general context of computer code or machine-usable instructions, including computer-executable instructions such as program components, being executed by a computer or other machine, such as a personal data assistant or other handheld device. Generally, program components, including routines, programs, objects, components, data structures, and the like, refer to code that performs particular tasks or implements particular abstract data types. Aspects of the technology described herein may be practiced in a variety of system configurations, including handheld devices, consumer electronics, general-purpose computers, and specialty computing devices. Aspects of the technology described herein may also be practiced in distributed computing environments where tasks are performed by remote-processing devices that are linked through a communications network.

With continued reference to FIG. 17, computing device 1700 includes a bus 1710 that directly or indirectly couples the following devices: memory 1712, one or more processors 1714, one or more presentation components 1716, input/output (I/O) ports 1718, I/O components 1720, an illustrative power supply 1722, and a radio(s) 1724. Bus 1710 represents what may be one or more buses (such as an address bus, data bus, or combination thereof). Although the various blocks of FIG. 17 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventors hereof recognize that such is the nature of the art, and reiterate that the diagram of FIG. 17 is merely illustrative of an exemplary computing device that can be used in connection with one or more aspects of the technology described herein. Distinction is not made between such categories as "workstation," "server," "laptop," and "handheld device," as all are contemplated within the scope of FIG. 17 and refer to "computer" or "computing device."

Computing device 1700 typically includes a variety of computer-readable media. Computer-readable media can be any available media that can be accessed by computing device 1700 and includes both volatile and non-volatile, removable and non-removable media. By way of example, and not limitation, computer-readable media may comprise computer storage media and communication media. Computer storage media includes both volatile and non-volatile, removable and non-removable media implemented in any method or technology for storage of information such as computer-readable instructions, data structures, program sub-modules, or other data.

Computer storage media includes RAM, ROM, EEPROM, flash memory or other memory technology, CD-ROM, digital versatile disks (DVDs) or other optical disk storage, magnetic cassettes, magnetic tape, magnetic disk storage, or other magnetic storage devices. Computer storage media does not comprise a propagated data signal.

Communication media typically embodies computer-readable instructions, data structures, program sub-modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above should also be included within the scope of computer-readable media.

Memory 1712 includes computer storage media in the form of volatile and/or non-volatile memory. The memory 1712 may be removable, non-removable, or a combination thereof. Exemplary memory includes solid-state memory, hard drives, and optical-disc drives. Computing device 1700 includes one or more processors 1714 that read data from various entities such as bus 1710, memory 1712, or I/O components 1720. Presentation component(s) 1716 present data indications to a user or other device. Exemplary presentation components 1716 include a display device, speaker, printing component, and vibrating component. I/O port(s) 1718 allow computing device 1700 to be logically coupled to other devices including I/O components 1720, some of which may be built-in.

Illustrative I/O components include a microphone, joystick, game pad, satellite dish, scanner, printer, display device, wireless device, a controller (such as a keyboard and a mouse), a natural user interface (NUI) (such as touch interaction, pen [or stylus] gesture, and gaze detection), and the like. In aspects, a pen digitizer (not shown) and accompanying input instrument (also not shown but which may include, by way of example only, a pen or a stylus) are provided in order to digitally capture freehand user input. The connection between the pen digitizer and processor(s) 1714 may be direct or via a coupling utilizing a serial port, parallel port, and/or other interface and/or system bus known in the art. Furthermore, the digitizer input component may be a component separated from an output component such as a display device, or in some aspects, the usable input area of a digitizer may be coextensive with the display area of a display device, integrated with the display device, or may exist as a separate device overlaying or otherwise appended to a display device. Any and all such variations, and any combination thereof, are contemplated to be within the scope of aspects of the technology described herein.

An NUI processes air gestures, voice, or other physiological inputs generated by a user. Appropriate NUI inputs may be interpreted as ink strokes for presentation in association with the computing device 1700. These requests may be transmitted to the appropriate network element for further processing. An NUI implements any combination of speech recognition, touch and stylus recognition, facial recognition, biometric recognition, gesture recognition both on screen and adjacent to the screen, air gestures, head and eye tracking, and touch recognition associated with displays on the computing device 1700. The computing device 1700 may be equipped with depth cameras, such as stereoscopic camera systems, infrared camera systems, RGB camera systems, and combinations of these, for gesture detection and recognition. Additionally, the computing device 1700 may be equipped with accelerometers or gyroscopes that enable detection of motion. The output of the accelerometers or gyroscopes may be provided to the display of the computing device 1700 to render immersive augmented reality or virtual reality.

A computing device may include radio(s) 1724. The radio 1724 transmits and receives radio communications. The computing device may be a wireless terminal adapted to receive communications and media over various wireless networks. Computing device 1700 may communicate via wireless protocols, such as code-division multiple access ("CDMA"), global system for mobiles ("GSM"), or time-division multiple access ("TDMA"), as well as others, to communicate with other devices. The radio communications may be a short-range connection, a long-range connection, or a combination of both a short-range and a long-range wireless telecommunications connection. When we refer to "short" and "long" types of connections, we do not mean to refer to the spatial relation between two devices. Instead, we are generally referring to short range and long range as different categories, or types, of connections (i.e., a primary connection and a secondary connection). A short-range connection may include a Wi-Fi® connection to a device (e.g., mobile hotspot) that provides access to a wireless communications network, such as a WLAN connection using the 802.11 protocol. A Bluetooth connection to another computing device is a second example of a short-range connection. A long-range connection may include a connection using one or more of CDMA, GPRS, GSM, TDMA, and 802.16 protocols.

The technology described herein has been described in relation to particular aspects, which are intended in all respects to be illustrative rather than restrictive.

What is claimed is:

1. One or more computer storage media having computer-executable instructions embodied thereon that, when executed by one or more processors, cause the one or more processors to perform a method, the method comprising:

obtaining a user query in association with a dataset;

identifying a set of facts relevant to the user query;

generating a data story using a portion of the set of facts relevant to the user query, the data story including a set of visualizations corresponding with the portion of the set of facts relevant to the user query, each fact of the set of facts representing an item of information extracted from the dataset;

using the set of facts relevant to the user query to generate a data summary of the set of facts by:

generating fact captions that each include natural language text representing a corresponding fact, of the set of facts, in a form of a fact tuple including a sequence of values associated with a type, a subspace, a breakdown, and/or a focus, generating fact contextual data, including numerical or categorical values related to one or more attributes associated with the fact captions, for the set of facts, generating a set of contextual facts, each contextual fact comprising a fact caption appended with corresponding fact contextual data including the numerical or categorical values related to the one or more attributes, selecting a subset of contextual facts to include in a prompt to generate a data summary, wherein the subset of contextual facts is selected based on fact scores generated for the contextual facts, wherein a fact score is generated in accordance with a diversity of a fact relative to the set of facts and an importance of the fact, and providing a prompt, having the subset of contextual facts, to a large language model to obtain the data summary as output; and providing for display, via a graphical user interface, the data story and the data summary.

2. The media of claim 1, wherein the set of facts relevant to the user query are identified using a similarity search.

3. The media of claim 1, wherein the set of facts relevant to the user query are identified using a similarity search performed using one or more key phrases identified from the user query and using the user query in its entirety in relation to a precomputed fact corpus including a set of fact captions.

4. The media of claim 1 further comprising selecting the portion of the set of facts relevant to the query using a maximum margin relevance algorithm.

5. The media of claim 1, further comprising:

obtaining user feedback indicating an interest related to an aspect or attribute of the displayed data story;

refining the user query based on the user feedback;

using the refined user query to identify a new set of facts relevant to the refined user query; and generating a refined data story using a new portion of the new set of facts relevant to the user query.

6. The media of claim 1, further comprising generating the prompt.

7. The media of claim 6, wherein the prompt includes a unique source indicator associated with at least one fact relevant to the user query and an instruction to use the unique source indicator in generating the data summary.

8. The media of claim 1, wherein the data summary includes citations that reference corresponding facts or fact visualizations.

9. A computer-implemented method comprising:

generating a data story using a portion of facts identified as relevant to a user query associated with a dataset, the data story providing fact visualizations corresponding with the portion of facts relevant to the user query;

providing for display, via a graphical user interface, the data story;

receiving user feedback indicating a desired or undesired attribute associated with a particular fact visualization associated with the data story;

refining the user query, in a form of a vector representation, based on the desired or undesired attribute associated with the particular fact visualization, wherein refining the user query comprises modifying the vector representation of the user query in accordance with the user feedback to optimize the form of the vector representation to increase alignment with facts having the desired attribute and reduce alignment with facts having the undesired attribute;

using the refined user query to identify a refined set of facts relevant to the refined user query including the desired or undesired attribute associated with the particular fact visualization;

identifying a portion of the refined set of facts relevant to the refined user query using a maximum margin relevance algorithm;

generating a refined data story using the portion of the refined set of facts relevant to the refined user query including the desired or undesired attribute associated with the particular fact visualization;

initiating generation of a data summary, via a large language model, using the refined set of facts relevant to the refined user query including the desired or undesired attribute associated with the particular fact visualization; and providing for display, via the graphical user interface, the data summary.

10. The method of claim 9, wherein using the refined user query to identify the refined set of facts relevant to the refined user query comprises performing a similarity search using the refined user query in relation to a precomputed fact corpus.

11. The method of claim 9, wherein the refined user query is used to identify the refined set of facts based on a similarity search performed via the refined user query relative to a fact corpus.

12. The method of claim 9, wherein the user feedback comprises binary feedback using a relevance indicator associated with the desired or undesired attribute associated with the particular fact visualization of the data story.

13. The method of claim 9, wherein refining the user query is performed based on a user selection to refine the data story based on the user feedback.

14. A computing system comprising:

a processor; and computer storage memory having computer-executable instructions stored thereon which, when executed by the processor, configure the computing system to:

identify a set of facts relevant to a user query, each fact, of the set of facts, in a form of a fact tuple including a sequence of values associated with a type, a subspace, a breakdown, and/or a focus;

determine fact scores for the facts relevant to the user query, wherein a fact score for a particular fact is generated based on diversity of the particular fact and importance of the particular fact;

use the fact scores for the facts relevant to the user query to select a portion of facts, of the set of facts relevant to the user query, in association with a prompt to generate a data summary;

generate the prompt including contextual facts associated with the selected portion of facts, each contextual fact comprising a fact caption and a fact contextual data pair, the fact contextual data including numerical or categorical values related to one or more attributes associated with the corresponding fact caption, wherein the prompt further includes unique source indicators in association with the contextual facts and an instruction to include the unique source indicators to provide citations in the data summary;

provide the prompt, as input into a large language model, to generate a data summary associated with the selected portion of facts; and obtain, as output from the large language model, the data summary associated with the selected portion of facts.

15. The system of claim 14, further comprising generating the contextual facts corresponding with the selected portion of facts by concatenating fact captions and fact contextual data.

16. The system of claim 14, wherein an integer linear program is used to select the portion of facts using the fact scores for the facts relevant to the user query.

17. The system of claim 14, wherein the prompt further includes data context and an instruction to generate the data summary.

* * * * *